United States Patent
Matsuyama

(10) Patent No.: US 7,155,418 B2
(45) Date of Patent: Dec. 26, 2006

(54) ELECTRONIC CASH SYSTEM

(75) Inventor: Shinako Matsuyama, Tokyo (JP)

(73) Assignee: Sony Corporation (JP)

( * ) Notice: Subject to any disclaimer, the term of this patent is extended or adjusted under 35 U.S.C. 154(b) by 12 days.

(21) Appl. No.: 10/689,803

(22) Filed: Oct. 21, 2003

(65) Prior Publication Data

US 2004/0098352 A1 May 20, 2004

Related U.S. Application Data

(62) Division of application No. 09/555,850, filed on Jun. 5, 2000, now Pat. No. 6,766,306.

(51) Int. Cl.
*G06Q 20/00* (2006.01)

(52) U.S. Cl. .......................... 705/68; 713/168

(58) Field of Classification Search ............ 705/26–27, 705/50–53, 64–72, 79; 713/168–180, 182–187, 713/189–194; 380/277, 28–30, 259–260
See application file for complete search history.

(56) References Cited

U.S. PATENT DOCUMENTS

| | | | |
|---|---|---|---|
| 5,315,656 A | 5/1994 | Devaux et al. | |
| 5,535,276 A | 7/1996 | Ganesan | |
| 5,677,955 A | 10/1997 | Doggett et al. | |
| 5,784,464 A | 7/1998 | Akiyama et al. | |
| 5,915,023 A * | 6/1999 | Bernstein | 705/75 |
| 6,128,391 A * | 10/2000 | Denno et al. | 380/283 |
| 6,226,618 B1 * | 5/2001 | Downs et al. | 705/1 |
| 6,282,522 B1 * | 8/2001 | Davis et al. | 705/41 |
| 6,311,171 B1 * | 10/2001 | Dent | 705/64 |
| 6,317,729 B1 * | 11/2001 | Camp et al. | 705/79 |

FOREIGN PATENT DOCUMENTS

| | | |
|---|---|---|
| EP | 0479617 | 4/1992 |
| EP | 0 791 901 A2 * | 8/1997 |

OTHER PUBLICATIONS

McAndrews, "Making Payments on the Internet", Business Review (Federal Reserve Bank of Philadelphia), pp. 3-14, Jan./Feb. 1997, ISSN: 0007-7011.*
The Future of Internet EC, Dec. 1997, Internal Auditor v54n6, pp. 32-33.

* cited by examiner

*Primary Examiner*—Mary D. Cheung
(74) *Attorney, Agent, or Firm*—Lerner, David, Littenberg, Krumholz & Mentlik, LLP

(57) ABSTRACT

Detection of frauds and circulation of money can be managed while no special apparatus is required, electronic cash can be securely utilized, and personal information and information on individual's purchase are not unnecessarily known. An account management unit 45 stores an amount of money utilized by a user based on information for identifying the user and previously deposited funds. A clearing unit 55 instructs a payment institution to make a settlement. The user management unit 35 manages the information for identifying the user, and an account number of the user in the payment institution encrypted with a public key of a settlement processing apparatus. A communication unit 37 instructs an account management apparatus to change the balance of the previously deposited funds of the user stored therein based on the information for identifying the user, and instructs the settlement apparatus to execute a settlement based on the account number in the payment institution.

5 Claims, 11 Drawing Sheets

ELECTRONIC CASH SYSTEM

CROSS-REFERENCE TO RELATED APPLICATIONS

This application is a division of U.S. application Ser. No. 09/555,850, filed Jun. 5, 2000, and now U.S. Pat. No. 6,766,306, issued Jul. 20, 2004, the disclosure of which is incorporated herein by reference.

BACKGROUND OF THE INVENTION

1. Technical Field

The present invention relates to an electronic cash system, and more particularly to an electronic cash system for processing a payment for an amount due with previously deposited funds.

2. Background Art

Current cash management schemes for electronic cash systems may be generally classified into a "balance management scheme" which manages the balance, utilizing devices immune to tampering, on the assumption that the balance cannot be tampered, and an "electronic bank note scheme" which assigns a face value and an identification number to electronic cash in order to manage the ID of cash issued by a center to check whether or not any bank note is double spent.

To put an electronic cash system to a practical use, it is necessary to realize the anonymity for user's personal information and purchase information, and an open loop type distribution which enables money to be transferred among arbitrary user devices, shops, and so on.

Mondex (trade name) is an electronic money system in accordance with the balance management scheme which satisfies the requirements mentioned above and has been widely used. In Mondex, serviced user devices and shops offering articles each hold a Mondex card, and the shops are further required to be equipped with a special apparatus for reading from and writing into a Mondex card, so that electronic cash is inputted or outputted therethrough.

The security on the user of Mondex on the Internet relies on the security ensured by the Mondex card which enhances the security by always providing two cryptographic modules such that the card is utilized by switching one of the modules which ensures the security. Also, since the Mondex system does not manage trade information at all, the anonymity is held for personal information and purchase logs.

With the Mondex system, however, the shops are required to manage special apparatus and burdened with labor and time therefor. In addition, since the Mondex system does not manage any trade information, an unauthorized use, if any, cannot be detected. Furthermore, the circulation of money cannot be managed.

SUMMARY OF INVENTION

The present invention has been made in view of the circumstance as mentioned above, and its object is to enable secure utilization of electronic cash, protection of personal information and individual's purchase information from being unnecessarily captured by respective apparatus, detection of unauthorized activities, and management of circulation of money without the need for managing special apparatus.

An electronic cash system of the invention includes an account management apparatus includes storage means for storing information for identifying a user, and the amount of money utilized by the user based on previously deposited funds, a settlement processing apparatus includes settlement instructing means for instructing a payment institution to settle, a control apparatus includes management means for managing the information for identifying a user, and an account number in the payment institution of the user, encrypted with a public key of the settlement processing apparatus, balance change instructing means for instructing the account management apparatus to change the balance of the deposited funds of the user, stored in the storage means of the account management apparatus, based on the information for identifying a user managed by the management means, and settlement execution instructing means for instructing the settlement instructing means of the settlement processing apparatus to execute a settlement based on the account number in the payment institution managed by the management means.

In this electronic cash system, the account management apparatus stores information for identifying the user and the amount of money utilized by the user based on previously deposited funds, the settlement processing apparatus instructs the payment institution to settle, the control apparatus manages the information for identifying a user, and an account number in the payment institution of the user, encrypted with a public key of the settlement processing apparatus, instructs the account management apparatus to change the balance of the deposited funds of the user, stored therein, based on the information for identifying the user, and instructs the settlement processing apparatus to execute a settlement based on the account number in the payment institution.

DETAILED DESCRIPTION

Figure 1:
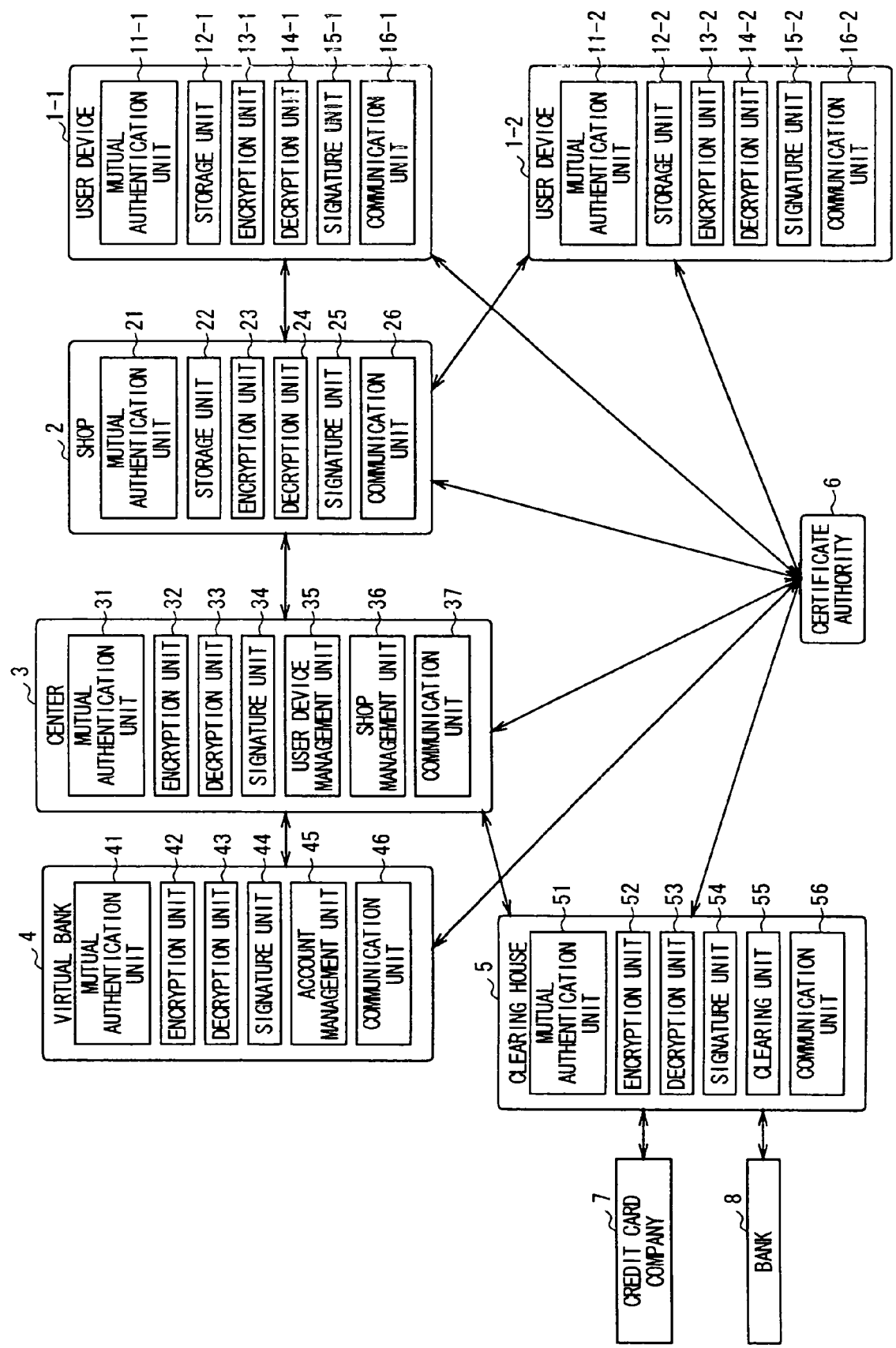
FIG. 1 is a diagram illustrating the configuration of an electronic cash system to which the present invention is applied.

Prior to explaining embodiments of the present invention, features of the present invention will be set forth below with a corresponding implementation (one example) added in parenthesis after each means in order to clarify a corresponding relationship between each means of the inventions described in claims and the following embodiments. The description, however, is not intended to limit each means to that described below.

Specifically, an electronic cash system includes an account management apparatus (for example, a virtual bank 4 in FIG. 1) includes storage means (for example, an account management unit 45 in FIG. 1) f or storing information for identifying a user, and the amount of money utilized by the user based on the previously deposited funds, a settlement processing apparatus (for example an clearing house 5 in FIG. 1) includes settlement instructing means (for example, a clearing unit 55 in FIG. 1) for instructing a payment institution to settle, a control apparatus (for example, a center 3 in FIG. 1) includes management means (for example, a user management unit 35 in FIG. 1) for managing the information for identifying a user, and an account number in the payment institution of the user, encrypted with a public key of the settlement apparatus, balance change instructing means (for example, a communication unit 37 in FIG. 1) for instructing the account management device to change the balance of the deposited funds of the user, stored in the storage means of the account management apparatus, based on the information for identifying a user managed by the management means, and settlement execution instructing means (for example, the communication unit 37 in FIG. 1) for instructing the settlement instructing means of the settlement processing apparatus to execute a settlement based on the account number in the payment institution managed by the management means.

FIG. 1 is a diagram representing the configuration of an electronic cash system to which the present invention is applied. A user device 1-1 purchases an article or receives a service from a shop 2, and pays the price therefor to the shop 2 through a center 3, the virtual bank 4 and a clearing house 5. A user device 1-2 purchases an article or receives a service from a shop 2, and pays the price therefor to the shop 2 through the center 3, the virtual bank 4 and the clearing house 5. The shop 2 provides articles or services to the user device 1-1 or 1-2, and receives payments from the user device 1-1 or the user device 1-2 through the center 3, the virtual bank 4 and the clearing house 5. The center 3 stores predetermined data on the user device 1-1, the user device 1-2 and the shop 2, and instructs the clearing house 5 to execute settlement transactions for the user device 1-1, the user device 1-2 and the shop 2. The virtual bank 4, which is an institution for issuing electronic money, issues IDs to units to which electronic money is issued (the user device 1-1 or 1-2 and the shop 2), and manages the balance or the amount of sales corresponding to the IDs. The clearing house 5 executes payment and deposit procedures for each account or each card number of the user device 1-1 or 1-2 and the shop 2 for a bank 8 or a card company 7. A certificate authority 6 responds to requests of the user device 1-1 to the clearing house 5 to issue a certificate including predetermined data.

A mutual authentication unit 11-1 of the user device 1-1 mutually authenticates with the user device 1-2, the shop 2, the center 3 or the certificate authority 6 through the processing later described. A storage unit 12-1 is composed of elements having tamper immunity for storing user ID, balance, and uncleared amount of money for electronic money. An encryption unit 13-1 encrypts predetermined data to be transmitted to the user device 1-2, the shop 2 or the center 3, such as the amount of purchase, information on purchased articles,.user ID of electronic money, and so on.

A decryption unit 14-1 decrypts encrypted information such as a user ID, amount, balance and so on which may be received from the user device 1-2, the shop 2, the center 3 or the certificate authority 6. A signature unit 15-1 applies a hash function to predetermined data such as the amount of purchase, information on purchased articles, user ID of electronic money, and so on, transmitted to the user device 1-2, the shop 2, the center 3 or the certificate authority 6, to calculate a hash value, and encrypts the hash value with a predetermined key to create a signature. The signature unit 15-1 also examines data or a signature added to data, which may be received from the user device 1-2, the shop 2, the center 3 or the certificate authority 6, to determine whether or not the data has not been tampered. A communication unit 16-1 transmits predetermined data to the user device 1-2, the shop 2, the center 3 or the certificate authority 6, and receives data transmitted from the user device 1-2, the shop 2, the center 3 or the certificate authority 6.

A mutual authentication unit 11-2, a storage unit 12-2, an encryption unit 13-2, a decryption unit 14-2, a signature unit 15-1, and a communication unit 16-2 of the user device 1-2 are similar to the mutual authentication unit 11-1, the storage unit 12-1, the encryption unit 13-1, the decryption unit 14-1, the signature unit 15-1, and the communication unit 16-1, respectively, of the user device 1-1, so that explanation thereon is omitted. In the following, the user device 1-1 and the user device 1-2 are simply referred to as the "user device 1" unless they should be particularly distinguished from each other.

A mutual authentication unit 21 of the shop 2, a mutual authentication unit 31 of the center 3, a mutual authentication unit 41 of the virtual bank 4, and a mutual authentication unit 51 of the clearing house 5 perform processing similar to the mutual authentication unit 11-1 of the user device 1-1, so that explanation thereon is omitted.

An encryption unit 23 of the shop 2, an encryption unit 32 of the center 3, an encryption unit 42 of the virtual bank 4, and an encryption unit 52 of the clearing house 5 perform processing similar to the encryption unit 13-1 of the user device 1-1, so that explanation thereon is omitted.

A decryption unit 24 of the shop 2, a decryption unit 33 of the center 3, a decryption unit 43 of the virtual bank 4, and a decryption unit 53 of the clearing house 5 perform processing similar to the decryption unit 14-1 of the user device 1-1, so that explanation thereon is omitted.

A signature unit 25 of the shop 2, a signature unit 34 of the center 3, a signature unit 44 of the virtual bank 4, and a signature unit 54 of the clearing house 5 perform processing similar to the signature unit 15-1 of the user device 1-1, so that explanation thereon is omitted.

A communication unit 26 of the shop 2, a communication unit 37 of the center 3, a communication unit 46 of the virtual bank 4, and a communication unit 56 of the clearing house 5 perform processing similar to the communication unit 16-1 of the user device 1-1, so that explanation thereon is omitted.

A storage unit 22 of the shop 2 is composed of elements having tamper immunity for storing shop IDs, the amount of sales, and so on.

A user management unit 35 of the center 3 stores and manages a credit card number of a user which is encrypted with the user's public keys Kpu corresponding to the user ID and with a public key Kppg of the clearing house 5. A shop management unit 36 of the center 3 stores and manages an account number of the shop 2 which is encrypted with a public key Kpm of the shop 2 corresponding to a shop ID and with the public key Kppg of the clearing house 5.

An account management unit 45 of the virtual bank 4 stores the balance of electronic cash for a user corresponding to a user ID, and the amount of sales for the shop 2 corresponding to the shop ID.

A clearing unit 55 of the clearing house 5 instructs the bank 8 or the card company 7 to execute payment and deposit procedures for each of accounts of the user device 1-1 or 1-2 and the shop 2.

While FIG. 1 illustrates as if the user device 1, the shop 2, the center 3, the virtual bank 4 and the clearing house 5, the certificate authority 6, and the credit company 7 and the bank 8 exist independently of one another, some functions of them may be collected into one. For example, the functions provided by the center 3, the virtual bank 4 and the clearing house 5 may be combined into the center 3.

The processing performed by the user device 1 when it initially deposits funds and registers its user ID in the virtual bank 4 will be explained with reference to a flow chart of FIG. 2. At step S11, the communication unit 16 of the user device 1 transmits personal information, account information and the public key Kpu of the user device 1 to the certificate authority 6. Here, the personal information refers to that with which the user device 1 can be identified, for example, ID or the like. The certificate authority 6 receives the data transmitted by the communication unit 16 of the user device 1. At step S12, the certificate authority 6 applies a predetermined hash function to the received personal information, account information and public key Kpu of the user device 1 to generate a hash value which is encrypted with a secret key Ksca of the certificate authority 6 to create a signature which is then appended to the personal information, the account information, and the public key Kpu of the user device 1 to create a certificate which is transmitted to the user device 1. FIG. 3 shows an example of the certificate for the user device. The certificate may include the name (ID) of the certificate authority, a certificate number (ID), an expiration date of the certificate, and so on in addition to those enumerated above. The communication unit 16 of the user device 1 receives the data transmitted by the certificate authority 6.

The signature is data attached to data or a certificate for checking it for tampering and authenticating its creator. The signature is created by applying a hash function to data to be transmitted to generate a hash value which is encrypted with a secret key of a public key cryptosystem.

The hash function and matching of signature will be explained. The hash function is a function which accepts predetermined data to be transmitted as an input, and compresses the predetermined data to data of a predetermined bit length which is outputted as a hash value. The hash function is characterized in that an input is predicted from a hash value (output) with difficulties, a large number of bits in the hash value changes when one bit in data inputted to the hash function has changed, and input data having the same hash value is difficult to find out.

A recipient, who has received a signature and data, decrypts the signature with the public key of the public key cryptosystem to obtain the result (hash value). Further, a hash value is calculated for the received data, and it is determined whether or not the calculated hash value is equal to the hash value obtained by decrypting the signature. If it is determined that the hash value of the transmitted data is equal to the decrypted hash value, it is found that the received data is not tampered, and is data transmitted from a source which holds a secret key corresponding to the public key. As the hash function for the signature, MD4, MD5, SHA-1 or the like may be employed.

Next, the public key cryptosystem will be explained. In contrast with a common key cryptosystem which employs the same key (common key) for encryption and decryption, the public key cryptosystem employs a key used for encryption different from a key for decryption. With the use of the public key cryptosystem, even if one key is published, the other can be held in secret. A key which may be published is referred to as a "public key," while the other key which is held in secret is referred to as a "secret key."

The RSA (Rivest-Shamir-Adleman) encryption, which is representative of public key cryptosystem, will be explained in brief. First, two sufficiently large prime numbers p and g are chosen, and the product n of p and q is calculated. Then, the least common multiple L of (p-1) and (q-1) is calculated. Further, a number e, which is equal to or more than three and less than L and is relatively prime with L, is found (i.e., a number which can divide commonly both e and L is only one).

Next, a multiplicative inverse element d of e related to a multiplication to modulus L is found. In other words, ed=1 mod L is established among d, e and L, so that d can be calculated by the Euclidean mutual division. In this event, n and e are chosen to be public keys, while p, q and d are chosen to be secret keys.

A cryptogram C is calculated from a clear text M through the processing represented by Equation (1):

$$C = M^e \bmod n \qquad (1)$$

The cryptogram C is decrypted to the clear text M through the processing represented by Equation (2):

$$M = C^d \bmod n \qquad (2)$$

While the demonstration is omitted, a clear text can be converted to a cryptogram by the RSA encryption and can be decrypted because this relies on Fermat's minor theorem, and Equation (3) is established:

$$M = C^d = (M^e)^d = M^{(ed)} \bmod n \qquad (3)$$

If the secret keys p and q are known, the secret key d can be calculated from the public key e. However, if the public key n has a number of digits so large that the prime factorization for the public key n is difficult in terms of the amount of computations, the secret key d cannot be computed from the public key a and therefore cannot be decrypted even if only the public key e is known. As described above, the RSA encryption can provide a key used for encryption and a key for decryption which are different from each other.

Also, an elliptic curve cryptosystem, which is another example of public key cryptosystem, will be explained in brief. A certain point on a elliptic curve $y^2 = x^3 + ax + b$ is assumed to be B. An addition of a point on the elliptic curve is defined, where nB represents the result of n-time additions of B. Similarly, a subtraction is also defined. It has been proven difficult to calculate n from B and nB. B and nB are chosen to be public keys, while n is chosen to be a secret key. Cryptograms C1 and C2 are calculated using a random number r from a clear text M through Equation (4) and Equation (5), respectively, with the public keys:

$$C1 = M + rnB \qquad (4)$$

$$C2 = rB \qquad (5)$$

The cryptograms C1 and C2 are decrypted to the clear text M through the processing represented by Equation (6):

$$M = C1 - nC2 \qquad (6)$$

Only those who have the secret key n can decrypt the cryptograms. As described above, the elliptic curve cryptosystem can also provide a key used for encryption and a key for decryption which are different from each other, as is the case of the RSA encryption.

At step S13, the mutual authentication unit 11 of the user device 1 mutually authenticates with the mutual authentication unit 31 of the center 3, and they share a coherence of random numbers R2∥R3, later described, as a temporary key Ktsu between the center 3 and the user device 1. A procedure for the mutual authentication will be described later with reference to a flow chart of FIG. 4. At step S14, the encryption unit 13 of the user device 1 encrypts the user's credit card number, which has been previously stored, with the public key Kppg of the clearing house 5, and the signature unit 15 appends the user's signature to the amount of issued electronic cash which has been set by the user device. In this event, the user's signature involves applying a hash function to the amount of issued electronic cash, and encrypting a resulting hash value with the secret key Ksu of the user 1. The encryption unit 13 of the user device 1 encrypts the encrypted credit card number and the amount of issued electronic cash appended with the signature with the temporary key Ktsu. The communication unit 16 transmits them to the center 3. The communication unit 37 of the center 3 receives the credit card number and the amount of issued electronic cash, transmitted thereto from the user device 1.

At step S15, the decryption unit 33 of the center 3 decrypts the credit card number and the amount of issued electronic cash encrypted with the temporary key Ktsu. The signature unit 34 compares a value derived by decrypting the signature appended to the amount of issued electronic cash by the decryption unit 33 with the public key Kpu of the user device included in the certificate of the user device 1 obtained through the mutual authentication, later described, with a hash value derived by applying a hash function to the amount of issued electronic cash decrypted with the temporary key Ktsu, and determines that the amount of issued electronic cash is not tampered if they are identical. If it is determined that the amount of issued electronic cash is tampered, the processing is aborted. When the amount of issued electronic cash is not tampered, the processing proceeds to step S16, where the mutual authentication unit 31 of the center 3 mutually authenticates with the mutual authentication unit 51 of the clearing house 5, and the center 3 and the clearing house 5 share a temporary key Ktsp. The procedure for the mutual authentication will be described later with reference to FIG. 4. At step S17, the signature unit 34 of the center 3 further appends a signature of the center 3 to the amount of issued electronic cash appended with the signature of the user device. The encryption unit 32 encrypts the certificate of the user device 1, the credit card number encrypted with the public key Kppg of the clearing house 5, and the amount of issued electronic cash appended with the signature of the center 3 and the signature of the user device 1, with the temporary key Ktsp. The communication unit 37 transmits the encrypted data to the clearing house 5. The communication unit 56 of the clearing house 5 receives the data transmitted thereto from the center 3.

At step S18, the decryption unit 53 of the clearing house 5 decrypts the data received from the center 3 with the temporary key Ktsp, and the signature unit 54 of the clearing house 5 verifies the signature of the center 3 and the signature of the user device 1, appended to the amount of issued electronic cash, to confirm that the amount of issued electronic cash is not tampered. Since the processing for verifying the signatures is similar to that at step S15, explanation thereon is omitted. If the signature unit 54 finds that the amount of issued electronic cash is tampered, the processing is aborted. When the amount of issued electronic cash is not tampered, the processing proceeds to step S19, where the decryption unit 53 decrypts the credit card number encrypted with the public key Kppg of the clearing unit 5 with a secret key Kspg of the clearing house 5 previously stored therein to derive the credit card number. Continuing with step S20, the clearing unit 55 delivers credit and transfer instructions to the credit card company 7 through the communication unit 56.

At step S21, the signature unit 54 appends a signature of the clearing house 5 to the verified result at step S18 and step S19, and the processed result at step S20. The encryption unit 52 encrypts the verified result and processed result appended with the signature with the temporary key Ktsp. The communication unit 56 transmits the encrypted verified result and processed result to the center 3. The communication unit 37 of the center 3 receives the verified result and the processed result transmitted thereto from the clearing house 5, and the decryption unit 33 decrypts the verified result and the processed result received from the clearinghouse 5. If the verified result thus received indicates a fraud, and the processed result indicates that the processing was not normally completed, the processing is aborted.

If the verified result received at step S21 indicates that there is no fraud, and the processed result indicates that the processing was normally completed, the processing proceeds to step S22, where the mutual authentication unit 31 of the center 3 mutually authenticates with the mutual authentication unit 41 of the virtual bank 4, and the center 3 and the virtual bank 4 share a temporary key Ktsb. The procedure for the mutual authentication will be described later with reference to the flow chart of FIG. 4. At step S23, the encryption unit 32 encrypts the certificate of the user device 1, and the amount of issued electronic money appended with the signature of the center 3 and the signature of the user device 1 with the temporary key Ktsb. The communication unit 37 transmits the encrypted certificate of the user device 1 and electronically issued amount to the virtual bank 4. The communication unit 46 of the virtual bank 4 receives the certificate of the user device 1 and the electronically issued amount transmitted thereto from the center 3.

At step S24, the decryption unit 43 of the virtual bank 4 decrypts the certificate of the user device 1 and the electronically issued amount received from the center 3 with the temporary key Ktsb, and the signature unit 44 verifies the signature of the center 3 and the signature of the user device 1 appended to the amount of issued electronic cash to confirm that the amount of issued electronic cash is not tampered. Since the processing for verifying the signatures is similar to that at step S15, explanation thereon is omitted. If the signature unit 44 finds tampering in the amount of issued electronic cash, the processing is aborted. When the amount of issued electronic cash is not tampered, the account management unit 45 of the virtual bank 4 generates a user ID, and stores the amount of issued electronic money corresponding to the user ID at step S25. At step S26, the signature unit 44 appends a signature of the virtual bank 4 to the user ID. The encryption unit 42 encrypts the user ID with the temporary key Ktsb. The communication unit 46 transmits the encrypted user ID to the center 3. The communication unit 37 of the center 3 receives the user ID transmitted by the virtual bank 4.

At step S27, the decryption unit 33 of the center 3 decrypts the user ID transmitted by the virtual bank 4 with the temporary key Ktsb, and the user device management unit 35 stores and manages a set of the decrypted user ID, the public key Kpu of the user device received at step S13, and the credit card number encrypted with the public key Kppg of the clearing house 5 received at step S14. At step S28, the signature unit 34 of the center 3 appends a signature of the center 3 to the user ID. The encryption unit 32 encrypts the user ID with the temporary key Ktsu. The communication unit 37 transmits the encrypted user ID to the user device. The communication unit 16 of the user device 1 receives the user ID transmitted by the center 3.

At step S29, the decryption unit 14 of the user device 1 decrypts the received user ID with the temporary key Ktsu, and the storage unit 12 stores the received user ID and the amount of issued electronic cash transmitted at step S14 as the electronic cash balance.

In this way, during the initial deposit of funds, the user device 1 registers the user ID in the virtual bank 4, and stores the amount of issued electronic cash identical to the amount which has been previously paid in correspondence to the user ID.

The processing for the mutual authentication performed at step S13 in FIG. 2 between the mutual authentication unit 11 of the user device 1 and the mutual authentication unit 31 of the center 1, using an elliptic curve cryptosystem of 160 bits in length which is a public key cryptosystem, will be explained with reference to a flow chart of FIG. 4. At step S41, the mutual authentication unit 11 of the user device 1 generates a 64-bit random number R1. At step S42, the mutual authentication unit 11 of the user device 1 transmits the certificate including the public key Kpu of itself (acquired from the certificate authority 5 at step S12) and the random number R1 to the mutual authentication unit 31 of the center 3.

At step S43, the mutual authentication unit 31 of the center 3 decrypts the signature (encrypted with the secret key Ksca of the certificate authority 6) in the received certificate with the public key Kpca of the certificate authority 6, which has been previously acquired, to extract the public key Kpu of the user device 1 and the hash value of the name of the user device 1, as well as to extract the public key Kpu of the user device 1 and the name of the user device 1 which are stored in the certificate in the form of clear text. If the certificate is true one issued by the certificate authority, the signature in the certificate can be decrypted, and the public key Kpu and the hash value of the name of the user device 1 produced by the decryption match the public key Kpu of the user device 1 stored in the certificate in the form of clear text and the hash value derived by applying the hash function to the name of the user device 1. This authenticates that the public key Kpu is not tampered but is true one. If the signature cannot be decrypted, or if the hash values do not match even if it can be decrypted, this means that the public key is not true or the user device is not true. In this event, the processing is aborted.

When proper authentication result is derived, the mutual authentication unit 31 of the center 3 generates a 64-bit random number R2 at step S44. At step S45, the mutual authentication unit 31 of the center 3 generates a coherence of the random number R1 and the random number R2, R1∥R2. At step S46, the mutual authentication unit 31 of the center 3 encrypts the coherence R1∥R2 with a secret key Ksesc of itself. At step S47, the mutual authentication unit 31 of the center 3 encrypts the coherence R1∥R2 with the public key Kpu of the user device 1 acquired at step S43. At step S48, the mutual authentication unit 31 of the center 3 transmits a certificate (which has been previously acquired from the certificate authority) including the coherence R1∥R2 encrypted with the secret key Ksesc, the coherence R1∥R2 encrypted with the public key Kpu, and the public key Kpesc of itself to the mutual authentication unit 11 of the user device 1.

At step S49, the mutual authentication unit 11 of the user device 1 decrypts the signature in the received certificate with the public key Kpac of the certificate authority, which has been previously acquired, and extracts the public key Kpesc from the certificate if it is correct. Since the processing in this event is similar to that at step S43, explanation thereon is omitted. At step S50, the mutual authentication unit 11 of the user device 1 decrypts the coherence R1∥R2 encrypted with the secret key Ksesc of the center 3 with the public key Kpesc acquired at step s49. At step S51, the mutual authentication unit 11 of the user device 1 decrypts the coherence R1∥R2 encrypted with the public key Kpu of itself with the secret key Ksu of itself. At step S52, the mutual authentication unit 11 of the user device 1 compares the coherence R1∥R2 decrypted at step S50 with the coherence R1∥R2 decrypted at step S51, and authenticates the center 3 as true if they match, and aborts the processing, regarding the center 3 as false, if they do not match.

When a true authentication result is derived, the mutual authentication unit 11 of the user device 1 generates a 64-bit random number R3 at step S53. At step S54, the mutual authentication unit 11 of the user device 1 generates a coherence R2∥R3 of the random number R2 acquired at step S50 and the random number R3 generated thereby. At step S55, the mutual authentication unit 11 of the user device 1 encrypts the coherence R2∥R3 with the public key Kpesc acquired at step S49. At step S56, the mutual authentication unit 11 of the user device 1 transmits the encrypted coherence R2∥R3 to the mutual authentication unit 31 of the center 3.

At step S57, the mutual authentication unit 31 of the center 3 decrypts the encrypted coherence R2∥R3 with the secret key Ksesc of itself. At step S58, the mutual authentication unit 31 of the center 3 authenticates the user device 1 as a true user device if the decrypted random number R2 matches the random number R2 generated at step S44 (the random number R2 before being encrypted), and aborts the processing, regarding the user device 1 as a false user device, if they do not match.

As described above, the mutual authentication unit 31 of the center 3 and the mutual authentication unit 11 of the user device 1 mutually authenticate. The random numbers utilized for the mutual authentication are utilized as temporary keys which are effective only in the processing subsequent to the mutual authentication.

The processing performed by the user device 1 for depositing funds to the virtual bank 4 second and subsequent times will be explained with reference to FIG. 5. At step S71, the mutual authentication unit 11 of the user device 1 mutually authenticates with the mutual authentication unit 31 of the center 3, and shares a temporary key Ktsu which is used between the center 3 and the user device 1. Since the procedure for the mutual authentication is similar to that previously explained with reference to FIG. 4, explanation thereon is omitted. At step S72, the signature unit 15 of the user device 1 appends a signature of a user 1 to the user ID and the amount of issued electronic cash. In this event, the signature may be collectively appended to the user ID and the amount of issued electronic cash. The encryption unit 13 of the user device 1 encrypts the user ID and the amount of issued electronic cash, appended with the signature, with the temporary key Ktsu, and the communication unit 16 transmits the user ID and the amount of issued electronic cash encrypted with the temporary key Ktsu to the center 3. The communication unit 37 of the center 3 receives the user ID and the amount of issued electronic cash encrypted with the temporary key Ktsu, which has been transmitted thereto from the user device 1.

At step S73, the decryption unit 33 of the center 3 decrypts the user ID and the amount of issued electronic cash encrypted with the temporary key Ktsu, with the temporary key Ktsu, and the signature unit 34 verifies the signature appended to the amount of issued electronic cash resulting from the decryption to confirm that the amount of issued electronic cash is not tampered. Since the verification of the signature is similar to the processing previously explained at step S15 in FIG. 2, explanation thereon is omitted. If the signature unit 34 finds tampering in the amount of issued electronic cash, the processing is aborted. When the amount of issued electronic cash is not tampered, the processing proceeds to step S74, where the user management unit 35 of the center 3 derives a credit card number, which has been encrypted with the public key Kppg of the clearing house stored at step S27 in FIG. 2, corresponding to the user ID.

Figure 2:
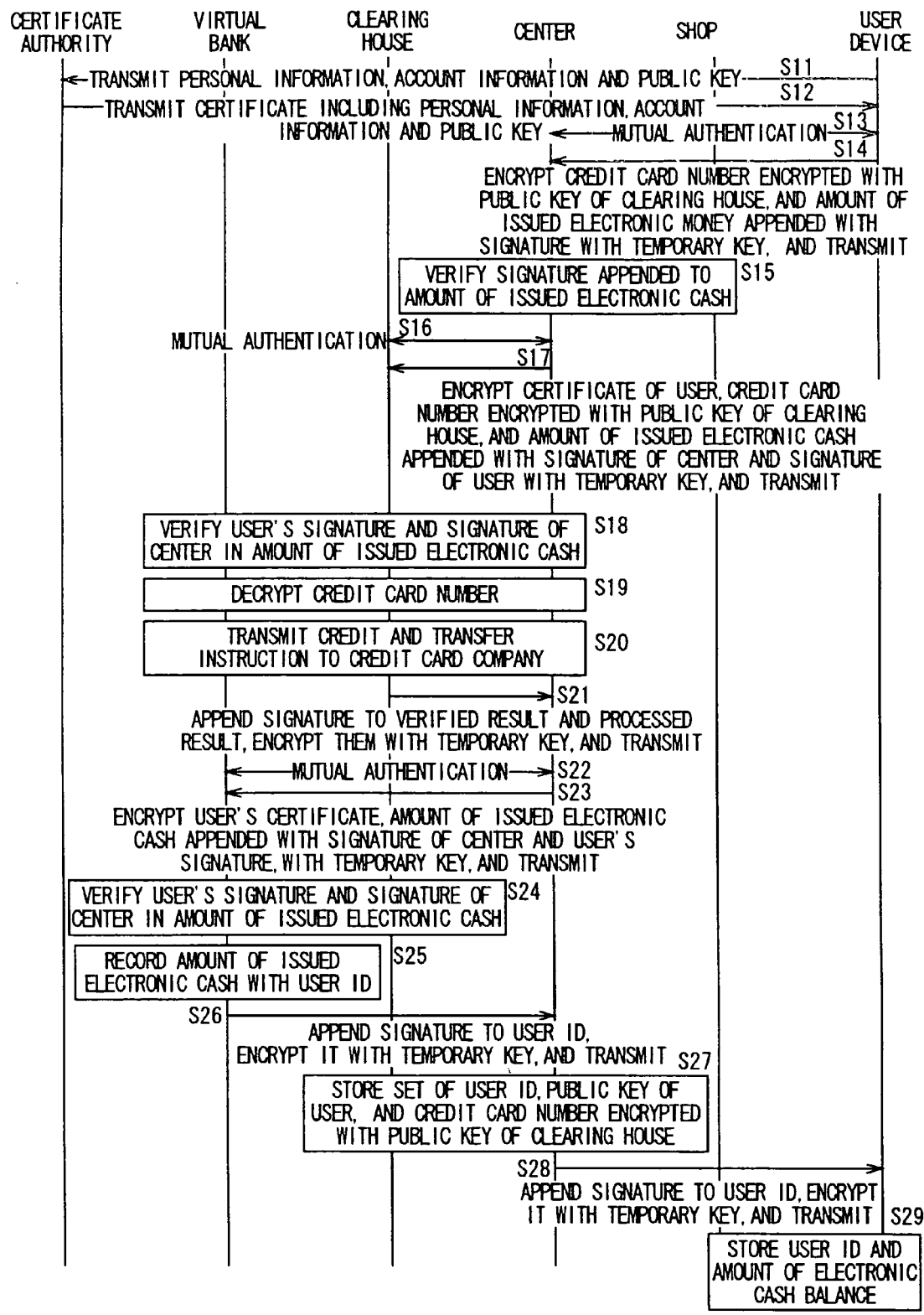
FIG. 2 is a flow chart for explaining the processing for initially depositing funds and registering a user ID in a virtual bank 4.
Figure 3:
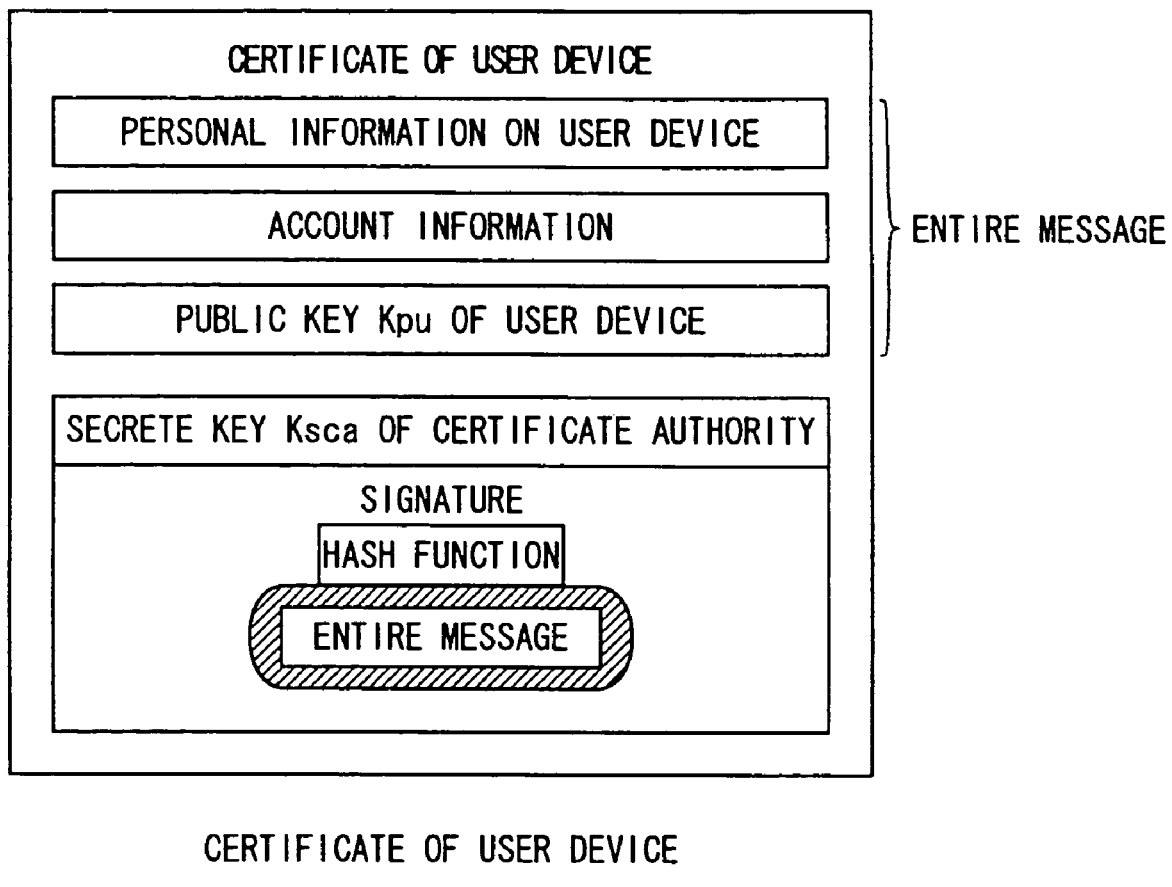
FIG. 3 is a diagram showing an example of data for certifying a user device.

Since step S75 through step S81 are similar to step S16 through step S22, respectively, in FIG. 2, explanation thereon is omitted.

At step S82, the signature unit 34 of the center 3 appends a signature of the center 3 to the user ID and the amount of issued electronic cash, respectively appended with the signature of the user device, received at step S72. The encryption unit 32 encrypts the certificate of the user device 1, the user ID and the amount of issued electronic cash with the temporary key Ktsb. The communication unit 37 transmits these to the virtual bank 4. The communication unit 46 of the virtual bank 4 receives the certificate of the user device 1, the user ID and the amount of issued electronic cash transmitted by the center 3.

At step S83, the decryption unit 43 of the virtual bank 4 decrypts the certificate of the user device 1, the user ID and the amount of issued electronic cash, received at step S82, with the temporary key Ktsb, and the signature unit 44 verifies the signature of the center 3 and the signature of the user device 1 appended to the amount of issued electronic cash to confirm that the amount of issued electronic cash is not tampered. Since the verification of the signatures is similar to the processing previously explained at step S15 in FIG. 2, explanation thereon is omitted. If the signature unit 44 finds tampering in the amount of issued electronic cash, the processing is aborted. When the amount of issued electronic cash is not tampered, the account management unit 45 adds the amount of electronic cash issued this time to the amount of electronic cash corresponding to the user ID at step S84.

Since step S85 through step S87 are similar to the processing at step S26 through step S28, respectively, in FIG. 2, explanation thereon is omitted.

At step S88, the storage unit 12 of the user device 1 adds the amount of issued electronic cash transmitted at step S72 to the electronic cash balance stored in the storage unit 12, and stores the resulting amount.

In this way, the user device 1 can deposit electronic cash to the virtual bank 4 second and subsequent times in a similar manner.

Figure 6:
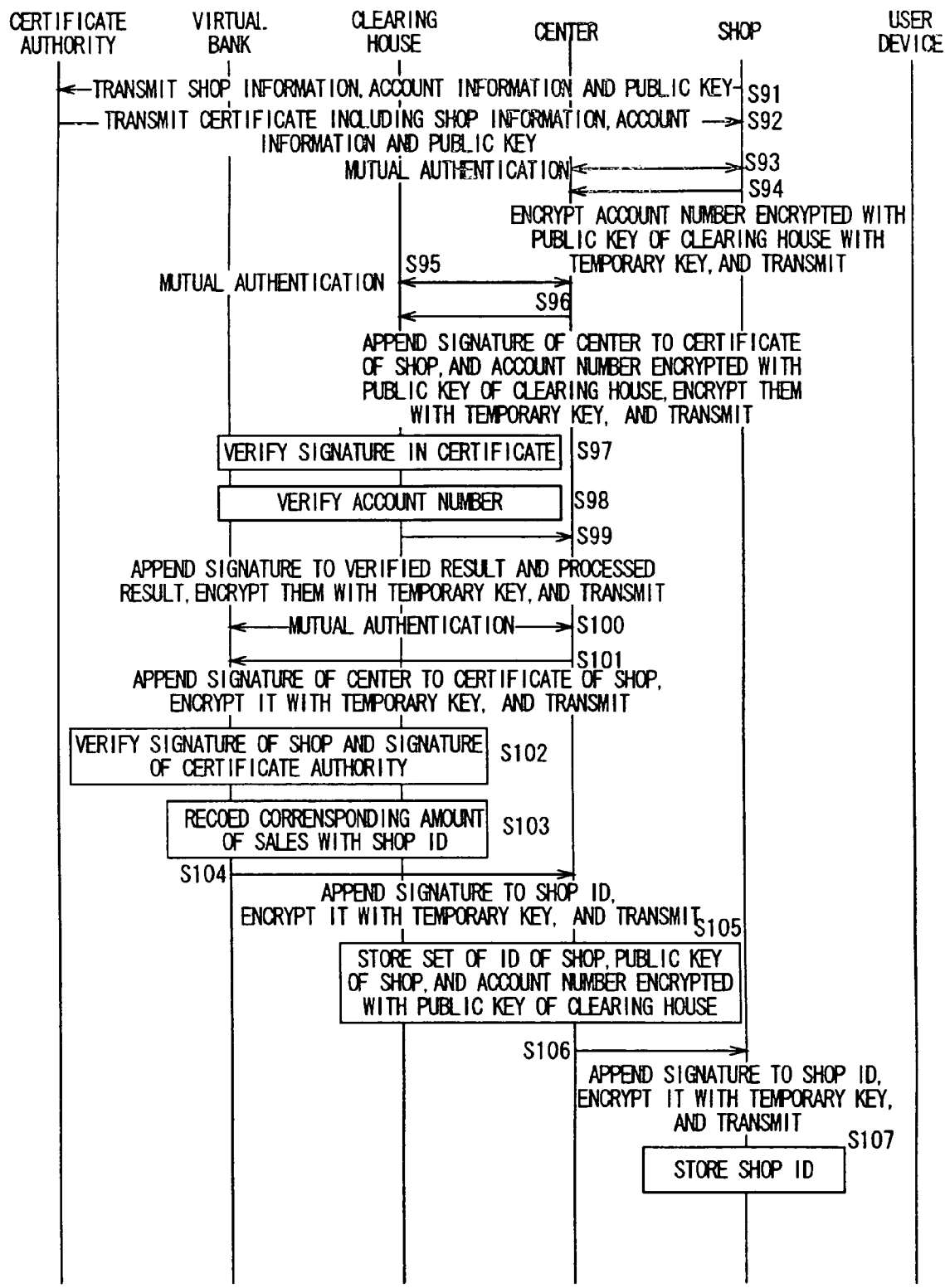
FIG. 6 is a flow chart for explaining the processing for registering a shop 2 in a center 3 and in the virtual bank 4.
Figure 7:
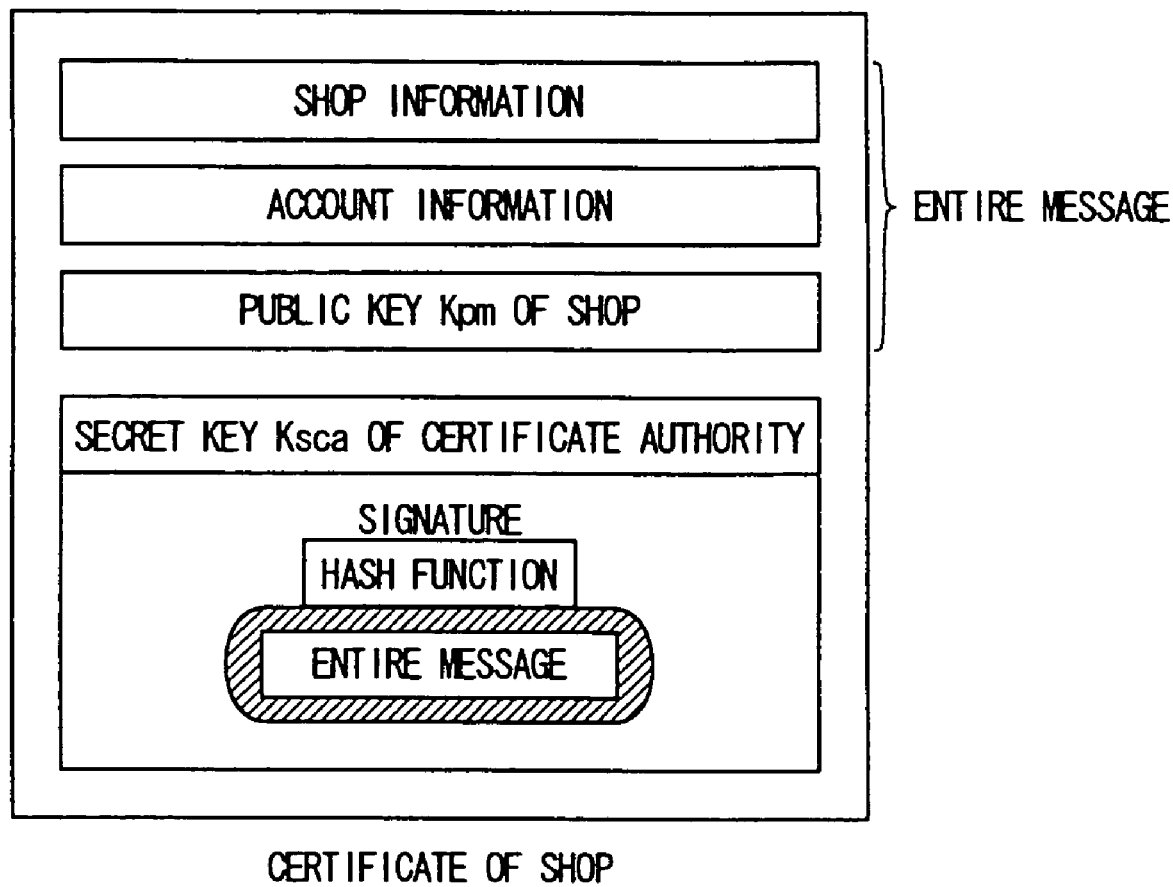
FIG. 7 is a diagram showing an example of data for certifying a shop.

Next, the processing performed by the shop 2 for registering itself in the center 3 and the virtual bank 4 will be explained with reference to FIG. 6. At step S91, the communication unit 26 of the shop 2 transmits shop information, account information, and a public key Kpm of the shop 2 to the certificate authority 6. Here, the shop information refers to that with which the shop 2 can be identified, for example, ID or the like. The certificate authority 6 receives the data transmitted by the communication unit 26 of the shop 2. At step S92, the certificate authority 6 applies a predetermined hash function to the received shop information, account information, and public key Kpm of the shop 2 to derive a hash value which is encrypted with a secret key Ksca of the certificate authority 6 to create a signature which is added to the shop information, the account information, and the public key Kpm of the shop 2 to crete a certificate which is transmitted to the shop 2. FIG. 7 shows an example of the certificate for a shop. The certificate may include the name of the certificate authority (ID), certificate number (ID), expiration date of the certificate, and so on, in addition to those enumerated above. The communication unit 26 of the shop 2 receives the data transmitted by the certificate authority 6.

Figure 4:
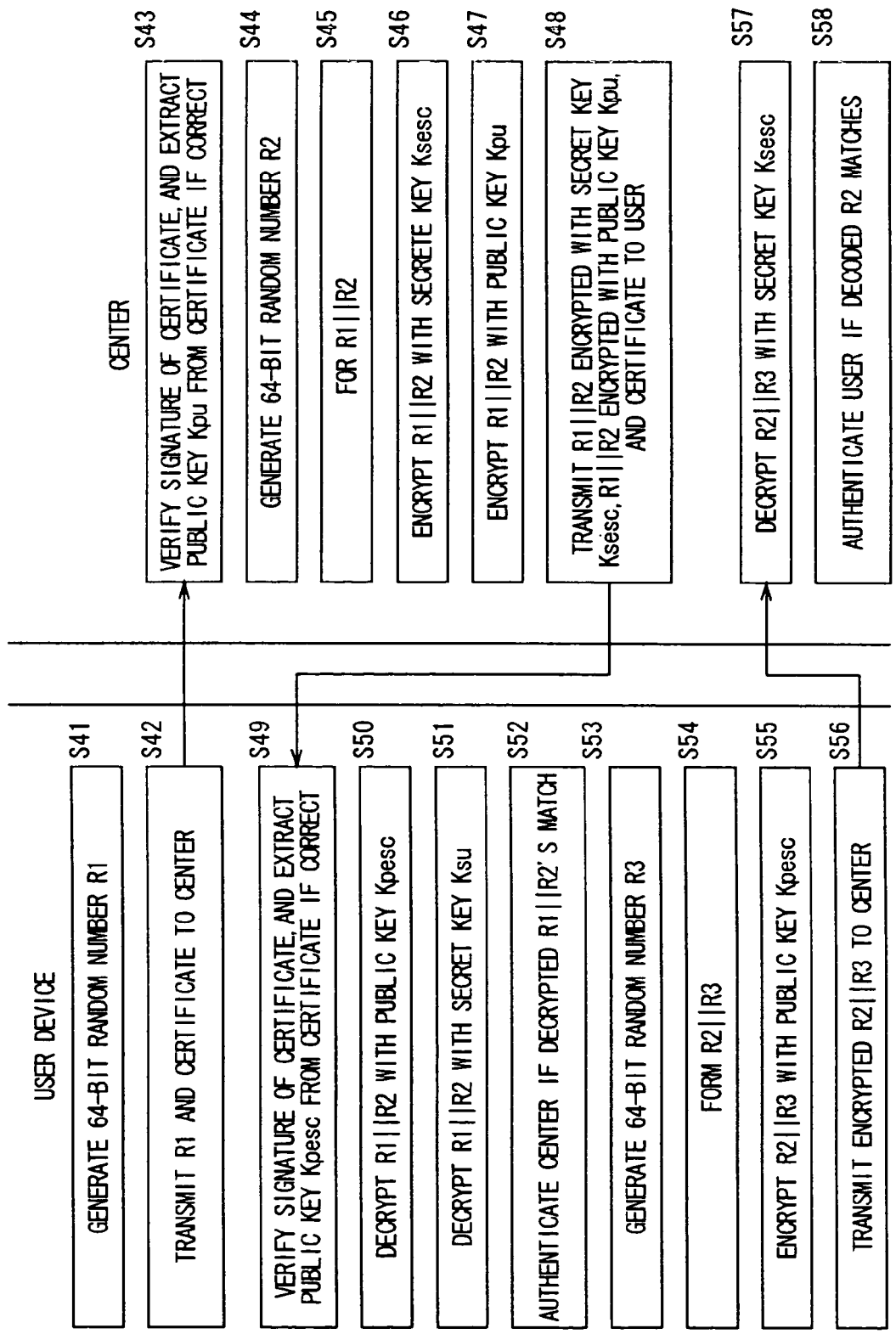
FIG. 4 is a diagram for explaining the processing for mutual authentication.
Figure 5:
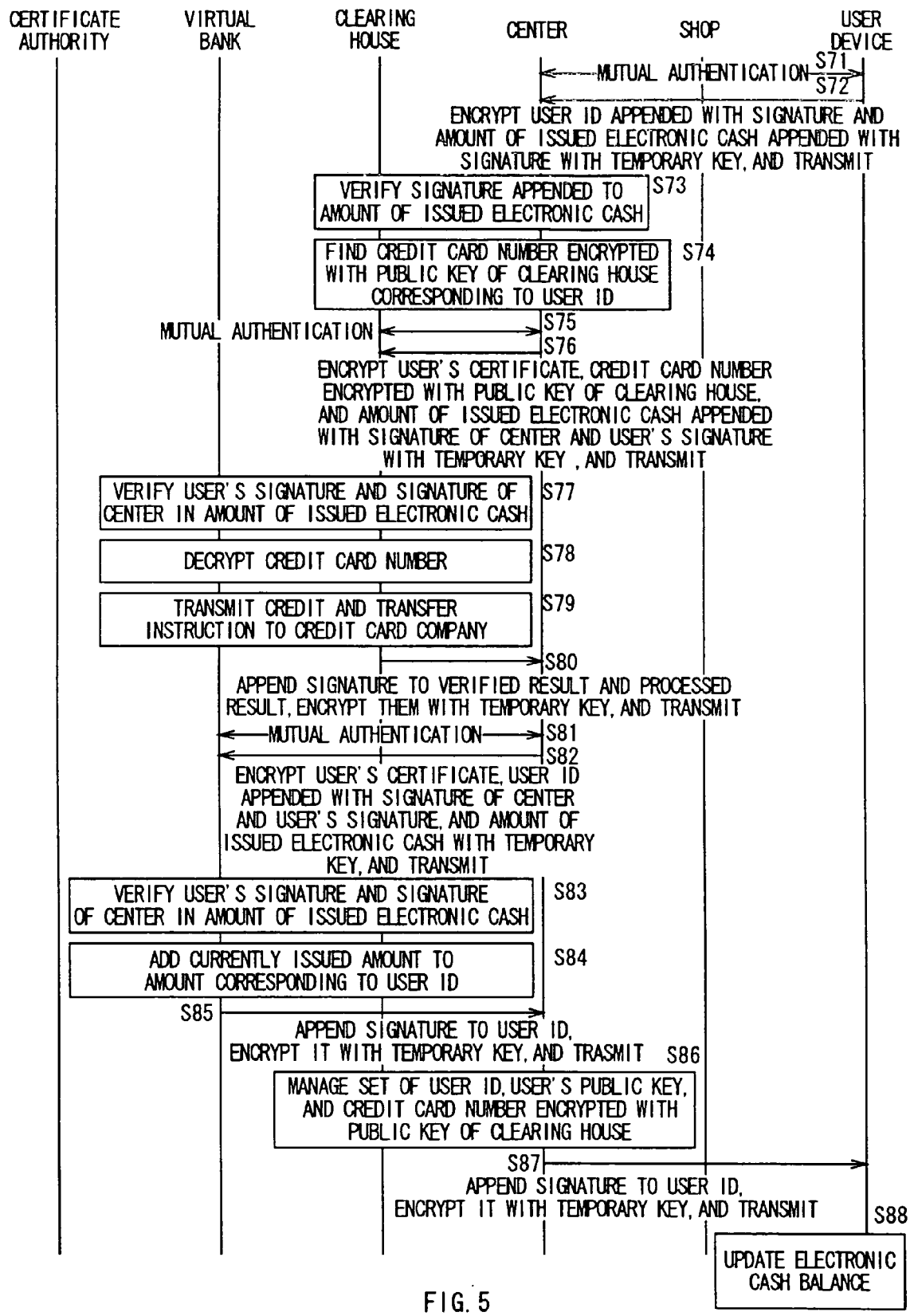
FIG. 5 is a flow chart for explaining the processing for a user device 1 to deposit funds in the virtual bank 4 second and subsequent times.

At step S93, the mutual authentication unit 21 of the shop 2 mutually authenticates with the mutual authentication unit 31 of the center 3, and the shop 2 and the center 3 share the coherence R2∥R3 of the random numbers at step S54 and at step S57 in FIG. 4 as a temporary key Ktsm. Since the procedure for the mutual authentication is similar to the processing in FIG. 4, explanation thereon is omitted. At step S94, the encryption unit 23 of the shop 2 encrypts the account number of shop 2, previously stored therein, with the public key Kppg of the clearing house 5. The encryption unit 23 of the shop 2 further encrypts the account number encrypted with the public key Kppg of the clearing house 5 with the temporary key Ktsm, and also encrypts the certificate of the shop 2 with the temporary key Ktsm. The communication unit 26 transmits the account number and the certificate of the shop 2, encrypted with the temporary key Ktsm, to the center 3. The communication unit 37 of the center 3 receives the account number and the certificate encrypted with the temporary key Ktsm, transmitted thereto from the shop 2, and the decryption unit 33 decrypts the account number and the certificate encrypted with the temporary key Ktsm.

Continuing with step S95, the mutual authentication unit 31 of the center 3 mutually authenticates with the mutual authentication unit 51 of the clearing house 5, and the mutual authentication unit 31 of the center 3 and the mutual authentication unit 51 of the clearing house 5 share the coherence R2∥R3 of the random numbers at step S54 and at step S57 in FIG. 4 as a temporary key Ktsp. Since the procedure for the mutual authentication is similar to the processing in FIG. 4, explanation thereon is omitted. At step S96, the signature unit 34 of the center 3 appends a signature to the account number of the shop 2. The encryption unit 32 further encrypts the certificate of the shop 2, the account number appended with the signature of the center 3 and encrypted with the public key Kppg of the clearing house 5 with the temporary key Ktsp. The communication unit 37 transmits the data encrypted with the temporary key Ktsp to the clearing house 5. The communication unit 56 of the clearing house 5 receives the data transmitted thereto from the center 3.

At step S97, the decryption unit 53 of the clearing house 5 decrypt the data received from the center 3 with the temporary key Ktsp. The signature unit 54 of the clearing house 5 verifies the signature of the certificate authority 6 appended to the certificate to confirm that the certificate is not tampered. If the signature unit 34 finds tampering in the certificate, the processing is aborted. When the certificate is not tampered, the processing proceeds to step S98, where the signature unit 54 applies a hash function to the received account number to calculate a hash value, and verifies whether the calculated hash value matches a hash value in the certificate to confirm that the account number is not tampered. If the signature unit 34 finds tampering in the account number, the processing is aborted. When the account number is not tampered, at step S99, the signature unit 54 appends a signature to the verified result at step S98 and at step 98. The encryption unit 52 encrypts the verified result appended with the signature with the temporary key Ktsp. The communication unit 56 transmits the verified result encrypted with the temporary key Ktsp to the center 3. The communication unit 37 of the center 3 receives the verified result transmitted by the clearing house 5, and the decryption unit 33 decrypts the verified result received from the clearing house 5 with the temporary key Ktsp.

At step 100, the mutual authentication unit 31 of the center 3 mutually authenticates with the mutual authentication unit 41 of the virtual bank 4, and the center 3 and the virtual bank 4 share the coherence R2∥R3 of the random numbers at step S54 and at step S57 in FIG. 4 as the temporary key Ktsb. Since the procedure for the mutual authentication is similar to the processing in FIG. 4, explanation thereon is omitted. At step S101, the signature unit 34 of the center 3 appends a signature of the center 3 to the certificate of the shop 2. The encryption unit 32 encrypts the certificate of the shop 2 appended with the signature of the center 3 with the temporary key Ktsp. The communication unit 37 transmits the encrypted certificate to the virtual bank 4. The communication unit 46 of the virtual bank 4 receives the certificate of the shop 2 transmitted thereto from the center 3.

At step S102, the decryption unit 43 of the virtual bank 4 decrypts the certificate of the shop 2 received from the center 3 with the temporary key Ktsb. The signature unit 44 verifies the signature of the center 3 appended to the certificate of the shop 2 and the signature of the certificate authority 6 included in the certificate of the shop 2 to confirm that the certificate of the shop 2 is not tampered. If tampering is found in the certificate of the shop 2, the processing is aborted. When the certificate of the shop 2 is not tampered, the account management unit 45 of the virtual bank 4 generates a shop ID and stores the amount of sales corresponding to the shop ID at step S103.

Since the processing at step S104 through step S106 is similar to the processing at step S26 through step S28, respectively, in FIG. 2, explanation thereon is omitted.

At step S107, the decryption unit 24 of the shop 2 decrypts the received shop ID, and the storage unit 22 stores the shop ID received at step S106.

In this way, the shop 2 registers itself in the center 3 and the virtual bank 4, and stores the shop ID.

Next, a transfer of electronic cash from the user device 1-2 to the user device 1-1 will be explained with reference to a flow chart of FIG. 8. At step S121, the mutual authentication unit 11-2 of the user device 1-2 mutually authenticates with the mutual authentication unit 11-1 of the user device 1-1, and the user device 1-2 and the user device 1-1 share the coherence R2∥R3 of the random numbers ta step S54 and at step S57 in FIG. 4 as a temporary key Ktuu. Since the procedure for the mutual authentication is similar to the processing in FIG. 4, explanation thereon will be omitted. At step S122, the signature unit 15-2 of the user device 1-2 appends a signature of the user device 1-2 to data indicative of an amount to be transferred, set by the user, and the encryption unit 13-2 encrypts the data indicative of the amount to be transferred with the temporary key Ktuu. The communication unit 16-2 of the user device 1-2 transmits the data indicative of the amount encrypted with the temporary key Ktuu to the communication unit 16-1 of the user device 1-1. The communication unit 16-1 of the user device 1-1 receives the data indicative of the amount encrypted with the temporary key Ktuu.

At step S123, the decryption unit 14-1 of the user device 1-1 decrypts the encrypted data indicative of the amount with the temporary key Ktuu, and the storage unit 12-1 adds the amount to be transferred to an uncleared amount stored therein, and stores the resulting value. The uncleared amount refers to the total amount transferred and received from other user devices 1. At step S124, the signature unit 15-1 of the user device 1-1 appends a signature of the user device 1-1 to the data indicative of the amount to be transferred, and the encryption unit 13-1 encrypts the data indicative of the amount to be transferred with the temporary key Ktuu. The communication unit 16-1 of the user device 1-1 transmits the encrypted data indicative of the amount to the communication unit 16-2 of the user device 1-2. The communication unit 16-2 of the user device 1-2 receives the encrypted data indicative of the amount.

At step S125, the decryption unit 14-2 of the user device 1-2 decrypts the encrypted data indicative of the amount with the temporary key Ktuu, and the storage unit 12-2 subtracts the amount to be transferred, derived by the decryption, from an uncleared amount stored therein, and stores the resulting difference. At step S126, the signature unit 15-2 appends a signature of the user device 1-2 to data indicative of the completed transfer of electronic cash. The encryption unit 13-2 encrypts the data indicative of the completed transfer of electronic cash appended with the signature, with the temporary key Ktuu. The communication unit 16-2 transmits the encrypted data indicative of the completed transfer of electronic cash to the communication unit 16-1 of the user device 1-1. The communication unit 16-1 of the user device 1-1 receives the data indicative of the completed transfer of electronic cash encrypted with the temporary key Ktuu, followed by the termination of the processing.

As described above, the user device 1-2 transfers electronic cash to the user device 1-1.

Figure 9:
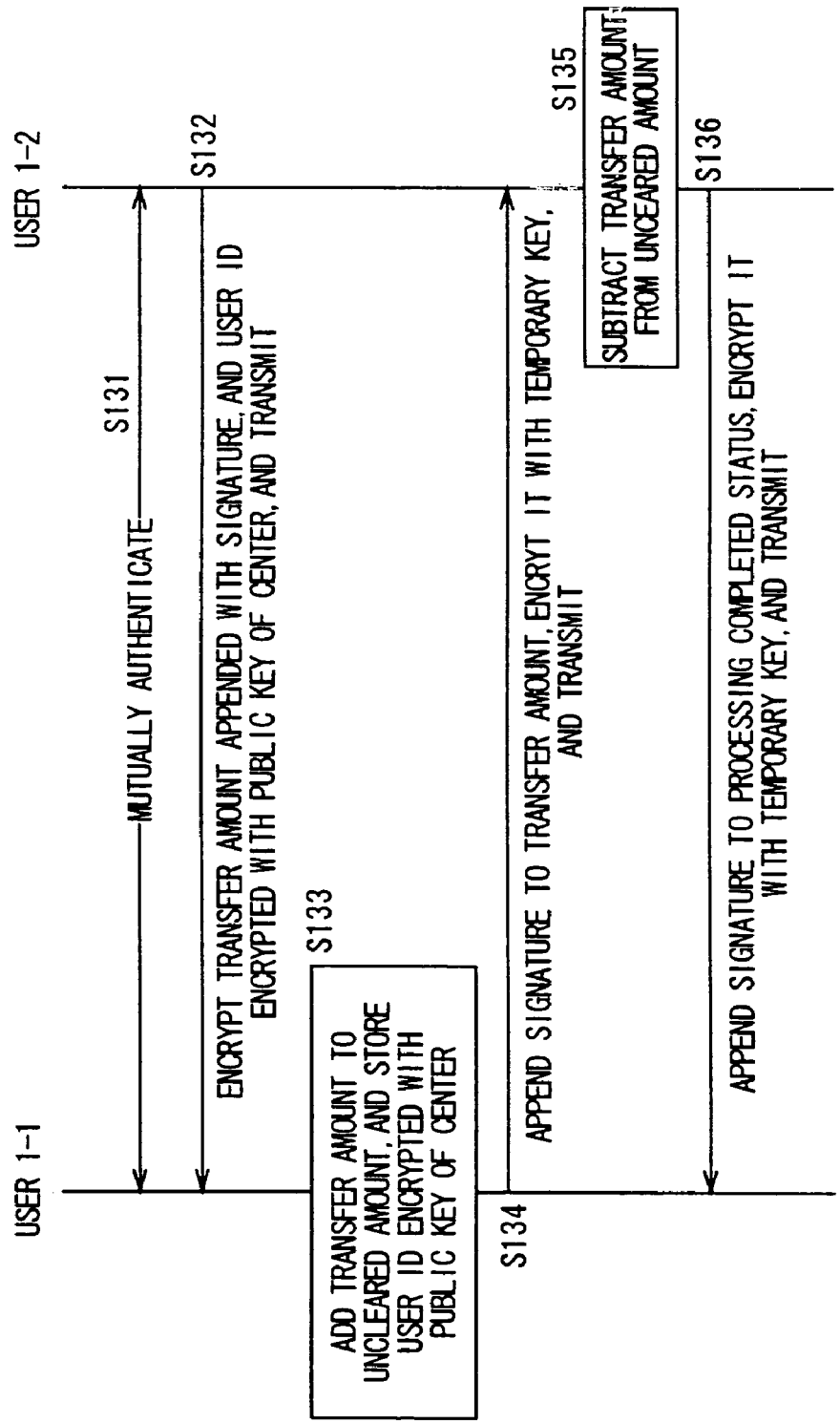
FIG. 9 is a flow chart for explaining the processing for transferring electronic cash from the user device 1-2 to the user device 1-1.

FIG. 9 is a flow chart for explaining other processing for transferring electronic cash from the user device 1-2 to the user device 1-1. At step S131, the mutual authentication unit 11-2 of the user device 1-2 mutually authenticates with the mutual authentication unit 11-1 of the user device 1-1, and the user device 1-2 and the use device 1-1 share the coherence R2∥R3 of the random numbers at step S54 and at step S57 in FIG. 4 as a temporary key Ktuu. Since the procedure for the mutual authentication is similar to the processing in FIG. 4, explanation thereon is omitted. At step S132, the signature unit 15-2 of the user device 1-2 appends a signature of the user device 1-2 to data indicative of an amount to be transferred, set by the user. The encryption unit 13-2 encrypts the user ID of the user device 1-2 with the public key Kpesc of the center 3, and also encrypts the data indicative of the amount to be transferred and the user ID of the user device 1-2 encrypted with the public key Kpesc of the center 3 with the temporary key Ktuu. The communication unit 16-2 of the user device 1-2 transmits the data indicative of the amount and the user ID of the user device 1-2 encrypted with the temporary key Ktuu to the communication unit 16-1 of the user device 1-1. The communication unit 16-1 of the user device 1-1 receives the encrypted data indicative of the amount and user ID of the user device 1-2.

At step S133, the decryption unit 14-1 of the user device 1-1 decrypts the encrypted data indicative of the amount and user ID of the user device 1-2 with the temporary key Ktuu. The storage unit 12-1 adds the amount to be transferred to an uncleared amount stored therein, and stores the resulting amount and the user ID of the user device 1-2 encrypted with the public key Kpesc of the center 3.

Figure 8:
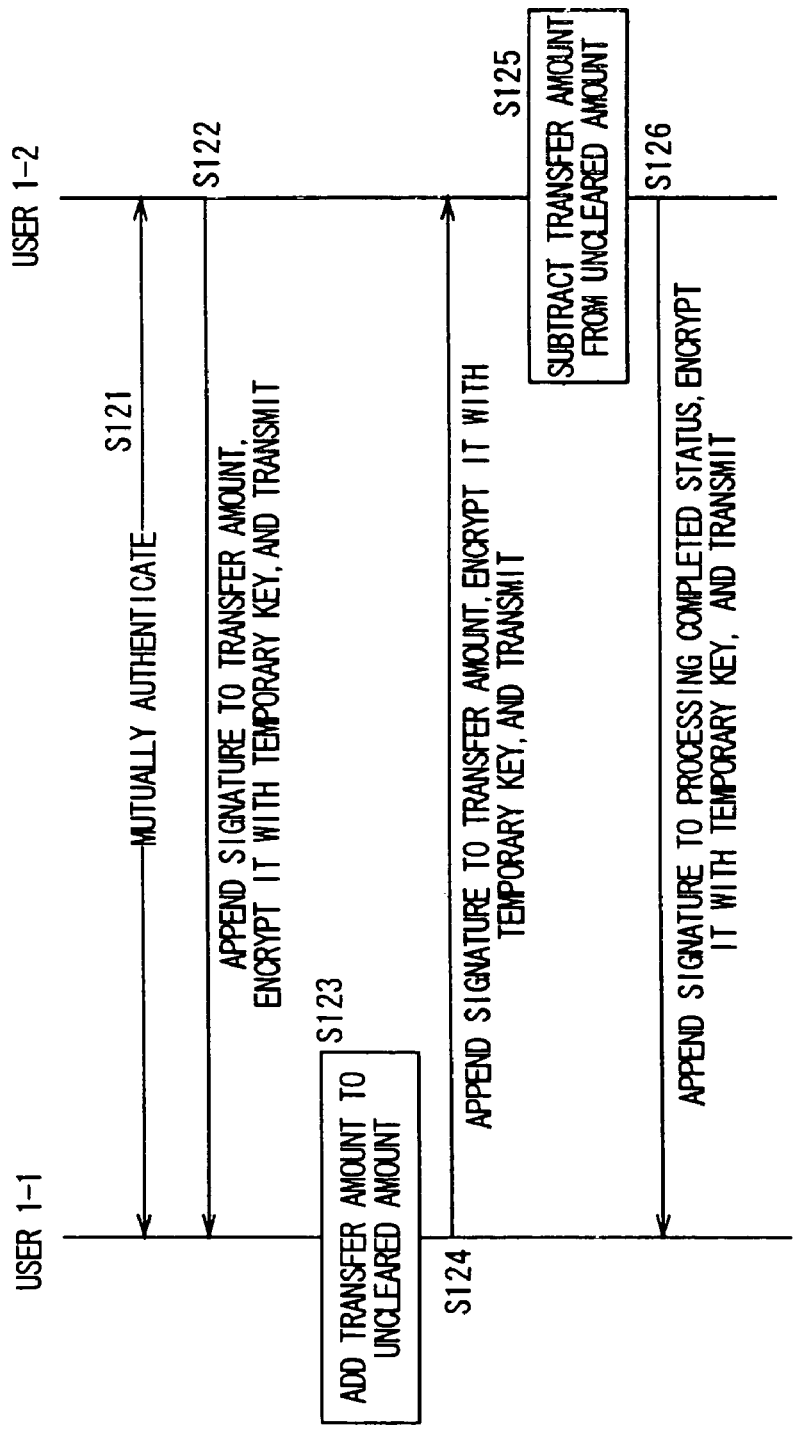
FIG. 8 is a flow chart for explaining the processing for transferring electronic cash from a user device 1-2 to a user device 1-1.

Since the processing at step S134 through step S136 is similar to the processing at step S124 through step S126, respectively, in FIG. 8, explanation thereon is omitted.

With the processing in FIG. 9, the user device 1-2 transfers electronic cash to the user device 1-1, while the user device 1-1 stores the user ID of the user device 1-2 together with the transferred cash.

Figure 10:
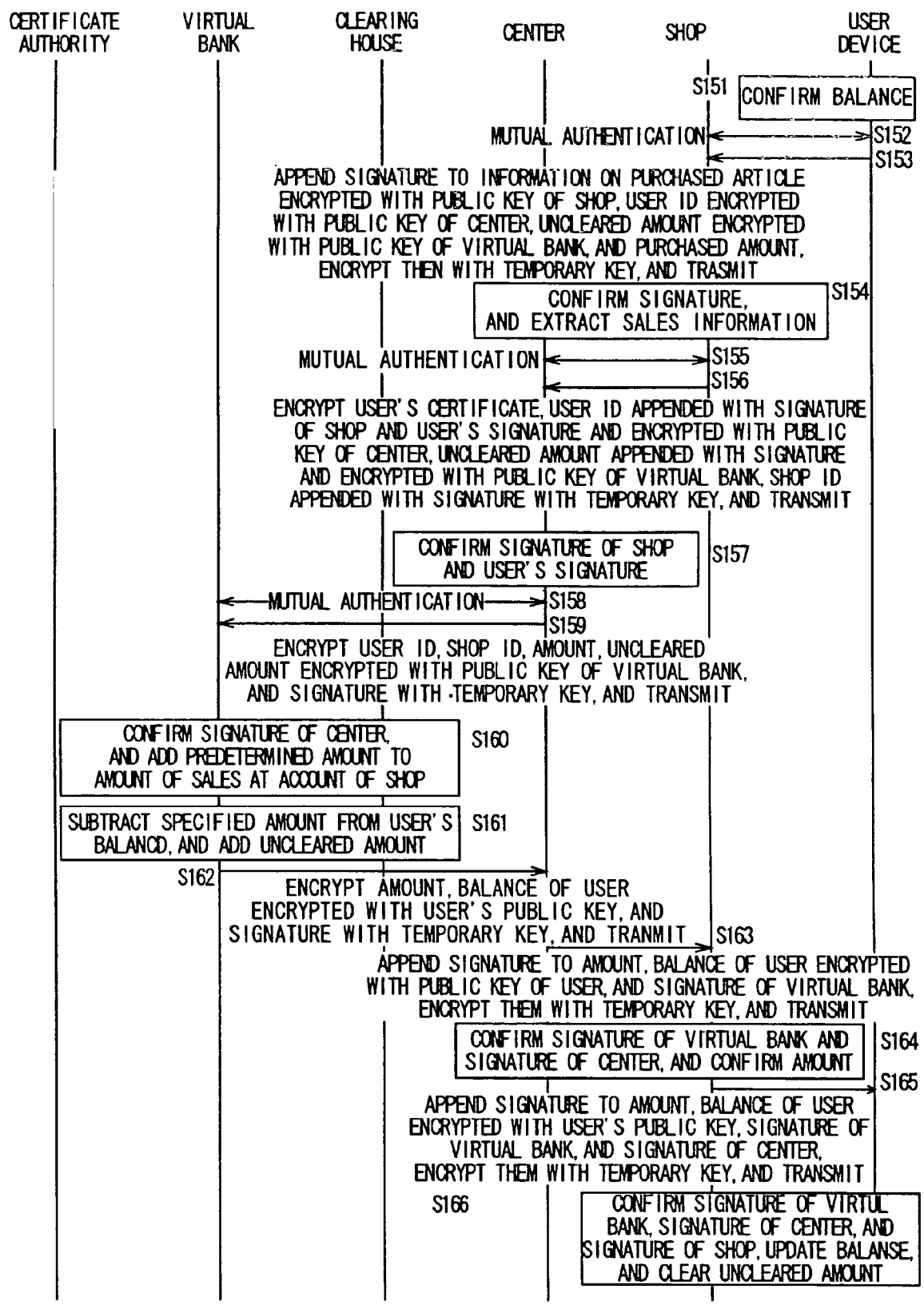
FIG. 10 is a flow chart for explaining the processing for a payment from the user device 1 to the shop 2.

Next, the processing for a payment from the user device 1 to the shop 2 with electronic cash will be explained with reference to a flow chart of FIG. 10. At step S151, the user confirms the electronic cash balance stored in the storage unit 12 of the user device 1, and, if the balance is insufficient for the amount of purchase, forces the user device 1 to execute the processing illustrated in FIG. 5 to store a required amount of electronic cash. At step S152, the mutual authentication unit 11 of the user device 1 mutually authenticates with the mutual authentication unit 21 of the shop 2, and the user device 1 and the shop 2 share the coherence R2∥R3 of the random numbers at step S54 and at step S57 in FIG. 4 as a temporary key Ktum. Since the procedure for the mutual authentication is similar to the processing in FIG. 4, explanation thereon is omitted.

At step S153, the encryption unit 13 of the user device 1 encrypts information on an article purchased from the shop 2 (information on a purchased article specified by the user through manipulations on the user device 1, for example, an article ID representative of the article) with the public key Kpm of the shop 2 previously stored in the storage unit 12, encrypts the user ID with the public key Kpesc of the center 3 previously stored in the storage unit 12, and encrypts an uncleared amount stored in the storage unit 12 with the public key Kpvb of the virtual bank 4.

Next, the signature unit 15 of the user device 1 appends a signature of the user device 1 to the information on the purchased article encrypted with the public key Kpm of the shop 2; the uncleared amount encrypted with the public key Kpvb of the virtual bank 4; and the user ID encrypted with the public key Kpesc of the center 3; and the amount of purchase. Here, the signature of the user device 1 is appended to the respective information. Alternatively, the signature of the user device 1 may be collectively appended to some or all of them. The encryption unit 13 of the user device 1 further encrypts the information on the purchased article encrypted with the public key Kpm of the shop 2 and appended with the signature; the user ID encrypted with the public key Kpesc of the center 3; the uncleared amount encrypted with the public key Kpvb of the virtual bank 4; and the amount of purchase with the temporary key Ktum. The communication unit 16 of the user device 1 transmits these data encrypted with the temporary key Ktum to the communication unit 26 of the shop 2. The communication unit 26 of the shop 2 receives these data.

At step S154, the signature unit 24 of the shop 2 verifies the signature in a variety of the received data to confirm whether or not they are tampered. If it is determined that they are tampered, the processing is aborted. When no tampering is determined, the decryption unit 24 decrypts these data encrypted with the temporary key Ktum. Also, the decryption key 24 decrypts the information on the purchased article encrypted with the public key Kpm of the shop 2 with a secret key Ksm of the shop 2.

At step S155, the mutual authentication unit 21 of the shop 2 mutually authenticates with the mutual authentication unit 31 of the center 3, and the shop 2 and the center 3 share the coherence R2∥R3 of the random numbers at step S54 and at step S57 in FIG. 4 as a temporary key Ktsm. Since the procedure for the mutual authentication is similar to the processing in FIG. 4, explanation thereon is omitted.

At step S156, the encryption unit 23 of the shop 2 encrypts the shop ID of the shop 2 stored in the storage unit 22 with the public key Kpesc of the center 3 acquired at step S155. The signature unit 25 appends a signature of the shop 2 to the shop ID which has been encrypted with the public key Kpesc of the center 3, and appends the signature of the shop 2 to the amount of purchase which has been appended with the signature of the user device 1 decrypted at step S154. The encryption unit 23 encrypts the certificate of the user acquired at step S152; and the user ID encrypted with the public key Kpesc of the center 3 and appended with the signature of the shop and the signature of the user device 1; the uncleared amount encrypted with the public key Kpvb of the virtual bank 4 and appended with the signature of the user device 1; the shop ID appended with the signature of the shop 2 and encrypted with the public key Kpesc of the center 3; and the amount of purchase with the temporary key Ktsm. The communication unit 26 transmits these data to the communication unit 37 of the center 3. The communication unit 37 of the center 3 receives these data encrypted with the temporary key Ktsm.

At step S157, the decryption unit 33 of the center 3 decrypts the certificate of the user; the user ID encrypted with the public key Kpesc of the center 3 and appended with the signature of the shop and the signature of the user device; the uncleared amount encrypted with the public key Kpvb of the virtual bank 4 and appended with the signature of the user device 1; the shop ID appended with the signature of the shop 2 and encrypted with the public key Kpesc of the center 3; and the amount of purchase appended with the signatures of the user device 1 and the shop 2, received at step S156, with the temporary key Ktsm. The signature unit 34 verifies the signature of the user device 1 and the signature of the shop 2 to the amount of purchase; the signature of the shop and the signature of the user device 1 appended to the user ID; and the signature of the shop 2 to the shop ID to confirm that the amount of purchase, the user ID and the shop ID are not tampered. If the signature unit 34 finds tampering in any of the amount of purchase, the user ID and the shop ID, the processing is aborted. If any of the amount of purchase, the user ID and the shop ID is not tampered, the mutual authentication unit 31 of the center 3 mutually authenticates with the mutual authentication unit 41 of the virtual bank 4 at step S158, and the center 3 and the virtual bank 4 share the coherence R2∥R3 of the random numbers at step S54 and at step S57 in FIG. 4 as a temporary key Ktsb. Since the procedure for the mutual authentication is similar to the processing in FIG. 4, explanation thereon is omitted.

At step S159, the signature unit 34 of the center 3 appends a signature to the user ID, the shop ID, the amount of purchase, and the uncleared amount encrypted with the public key Kpvb of the virtual bank 4. The encryption unit 32 of the center 3 encrypts the user ID, the shop ID, the amount of purchase, the uncleared amount encrypted with the public key Kpvb of the virtual bank 4, and the signature with the temporary key Ktsb. The communication unit 37 transmits these data to the communication unit 46 of the virtual bank 4. The communication unit 46 of the virtual bank 4 receives these data.

At step S160, the decryption unit 43 of the virtual bank 4 decrypts the encrypted user ID, shop ID, amount of purchase, uncleared amount encrypted with the public key Kpvb of the virtual bank 4, and signature of the center 3 with the temporary key Ktsb. The signature unit 44 verifies the signature of the center 3 to confirm that the user ID, the shop ID, the amount of purchase, and the uncleared amount encrypted with the public key Kpvb of the virtual bank 4 are not tampered. If the signature unit 44 finds tampering, the processing is aborted. When tampering is not found in any of the user ID, the shop ID, the amount of purchase, and the uncleared amount encrypted with the public key Kpvb of the virtual bank 4, the account management unit 45 adds the amount of purchase to the amount of sales corresponding to the shop ID. At step S161, the account management unit 45 subtracts the amount of purchase from the balance corresponding to the user ID, adds the uncleared amount to the balance corresponding to the user ID, and stores the resulting amount.

At step S162, the encryption unit 42 of the virtual bank 4 encrypts the balance corresponding to the user ID stored at step S161 with the public key Kpu of the user. The signature unit 44 signs the amount of purchase, and the balance corresponding to the user ID encrypted with the public key Kpu of the user. The communication unit 46 transmits the amount of purchase, the balance corresponding to the user ID encrypted with the public key Kpu of the user, and the signature to the communication unit 37 of the center 3. The communication unit 37 of the center 3 receives these data.

At step S163, the decryption unit 33 of the center 3 decrypts the amount of purchase, the balance corresponding to the user ID encrypted with the public key Kpu of the user, and the signature of the virtual bank 4. The signature unit 34 of the center 3 appends a signature of the center 3 to the amount of purchase, the balance corresponding to the user ID encrypted with the public key Kpu of the user, and the signature of the virtual bank 4. The encryption unit 32 encrypts the amount of purchase, the balance corresponding to the user ID encrypted with the public key Kpu of the user, and the signature of the virtual bank 4, which have been appended with the signature of the center 3, with the temporary key Ktsm. The communication unit 37 transmits the amount of purchase, the balance corresponding to the user ID encrypted with the public key Kpu of the user, the signature of the virtual bank 4, and the signature of the center 3, which have been encrypted with the temporary key Ktsm, to the communication unit 26 of the shop 2. The communication unit 26 of the shop 2 receives these data.

At step S164, the decryption unit 24 of the shop 2 decrypts the received amount of purchase, balance corresponding to the user ID encrypted with the public key Kpu of the user, signature of the virtual bank 4, and signature of the center 3, with the temporary key Ktsm. The signature unit 25 verifies the signature of the virtual bank 4 and the signature of the center 3 to confirm that there is no tampering in the received amount of purchase and balance corresponding to the user ID encrypted with the public key Kpu of the user. If the signature unit 25 finds tampering, the processing is aborted. If there is no tampering in any of the received amount of purchase and balance corresponding to the user ID encrypted with the public key Kpu of the user, the processing proceeds to step S165, where the signature unit 25 appends the signature of the shop 2 to the amount of purchase, the balance corresponding to the user ID encrypted with the public key Kpu of the user, the signature of the virtual bank 4, and the signature of the center 3. The encryption unit 23 encrypts the amount of purchase, the balance corresponding to the user ID encrypted with the public key Kpu of the user, the signature of the virtual bank 4, the signature of the center 3, and the signature of the shop 2 with the temporary key Ktum. The communication unit 26 transmits these data to the communication unit 16 of the user device 1. The communication unit 16 of the user device 1 receives these data.

At step S166, the decryption unit 14 of the user device 1 decrypts the received amount of purchase, balance corresponding to the user ID encrypted with the public key Kpu of the user, signature of the virtual bank 4, signature of the center 3, and signature of the shop 2 with the temporary key Ktum. The signature unit 15 verifies the signature of the virtual bank 4, the signature of the center 3, and the signature of the shop 2 to confirm that there is no tampering in the received amount of purchase, and balance corresponding to the user ID encrypted with the public key Kpu of the user. If the signature unit 15 finds tampering, the processing is aborted. If there is no tampering in any of the received amount of purchase, and balance corresponding to the user ID encrypted with the public key Kpu of the user, the storage unit 12 confirms whether or not the received balance is equal to the amount derived by subtracting the amount of purchase from the balance stored in the storage unit 12 prior to the start of the processing and adding the uncleared amount transmitted at step S153 to the resulting amount. When the received balance is equal to the amount derived by subtracting the amount of purchase from the balance stored in the storage unit 12 prior to the start of the processing and adding the uncleared amount transmitted at step S153 to the resulting amount, the balance is updated and stored, and the uncleared amount is set to zero, followed by the termination of the processing. If the received balance is not equal to the amount derived by subtracting the amount of purchase from the balance stored in the storage unit 12 prior to the start of the processing and adding the uncleared amount transmitted at step S153 to the resulting amount, the processing is terminated.

As described above, the user device 1 make a payment to the shop 2 through the virtual bank 4.

Figure 11:
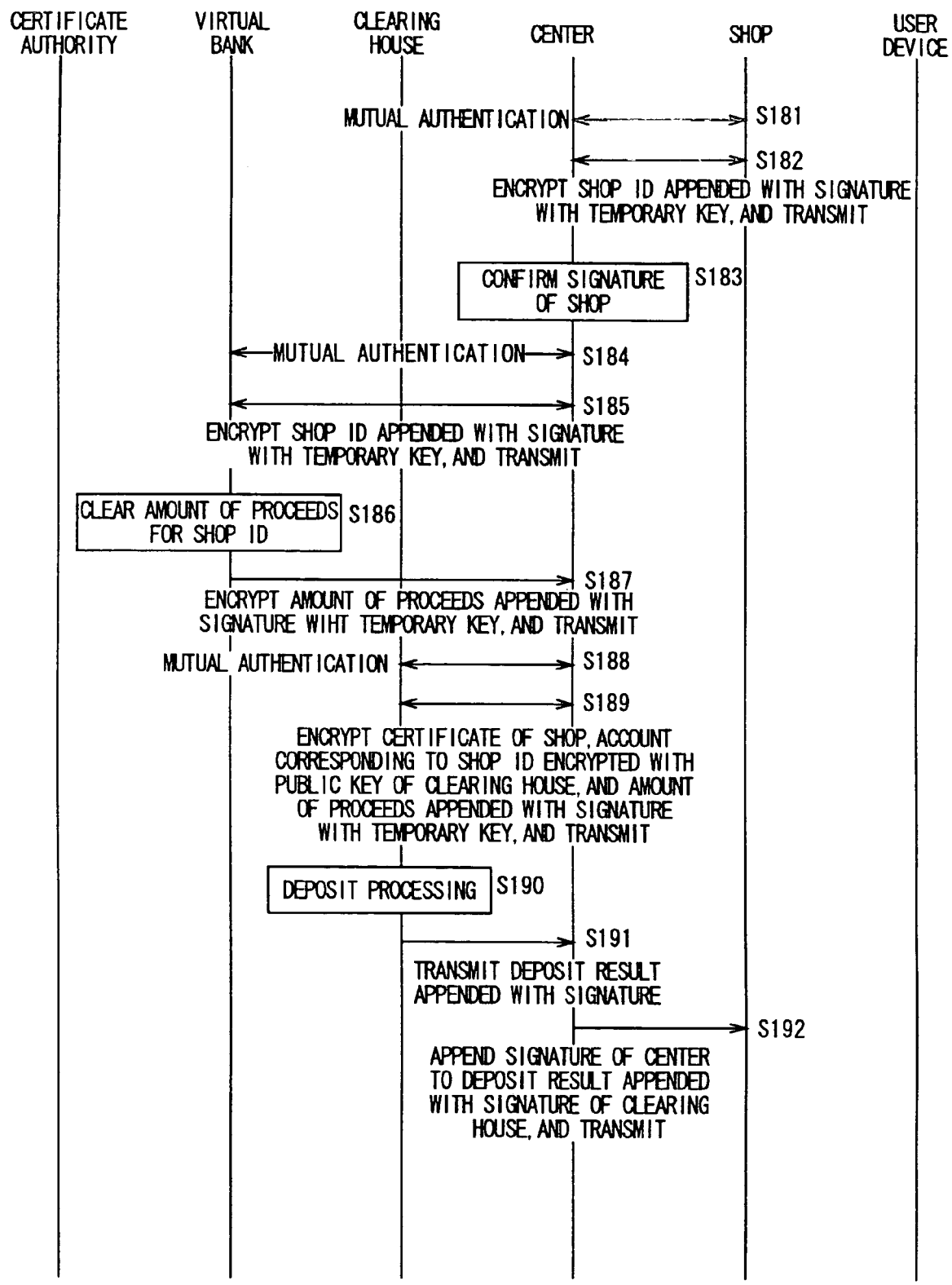
FIG. 11 is a flow chart for explaining the processing for depositing proceeds into an account of the shop 2.

The processing for transferring proceeds to the account of the shop 2 will be explained with reference to a flow chart of FIG. 11. At step A181, the mutual authentication unit 21 of the shop 2 mutually authenticates with the mutual authentication unit 31 of the center 3, and the shop 2 and the center 3 share the coherence R2∥R3 of the random numbers at step S54 and at step S57 in FIG. 4 as a temporary key Ktsm. Since the procedure for the mutual authentication is similar to the processing in FIG. 4, explanation thereon is omitted. At step S182, the encryption unit 23 of the shop 2 encrypts the shop ID of the shop 2, stored in the storage unit 22 at step S107 in FIG. 6, with the temporary key Ktsm. The signature unit 25 of the shop 2 appends a signature to the encrypted shop ID, and the encryption unit 23 encrypts the shop ID and the signature with the temporary key Ktsm. The communication unit 26 transmits the shop ID and the signature encrypted with the temporary key Ktsm to the communication unit 37 of the center 3. The communication unit 37 of the center 3 receives the shop ID and the signature.

At step S183, the decryption unit 33 of the center 3 decrypts the shop ID and the signature encrypted with the temporary key Ktsm. The signature unit 34 verifies the signature appended to the shop ID, derived by the decryption, to confirm that the shop ID is not tampered. If tampering is found in the shop ID, the processing is aborted. If no tampering is found in the shop ID, the mutual authentication unit 31 of the center 3 mutually authenticates with the mutual authentication unit 41 of the virtual bank 4 at step S184, and the center 3 and the virtual bank 4 share the temporary key Ktsb. Since the procedure for the mutual authentication is similar to the processing in FIG. 4, explanation thereon is omitted. At step S185, the signature unit 34 of the center 3 appends a signature to the shop ID confirmed at step S183, and the encryption unit 32 encrypts the shop ID and the signature with the temporary key Ktsb. The communication unit 37 transmits the shop ID and the-signature encrypted with the temporary key Ktsb to the communication unit 46 of the virtual bank 4. The communication unit 46 of the virtual bank 4 receives the shop ID and the signature.

At step S186, the decryption unit 43 of the virtual bank 4 decrypts the shop ID and the signature encrypted with the temporary key Ktsb. The signature unit 44 verifies the signature appended to the shop ID, derived by the decryption, to confirm that the shop ID is not tampered. If tampering is found in the shop ID, the processing is aborted. If no tampering is found in the shop ID, the account management unit 45 clears the amount of proceeds corresponding to the shop ID stored in the account management unit 45. At step S187, the signature unit 44 appends a signature to the amount of proceeds corresponding to the shop ID stored in the account management unit 45 (the amount of proceeds before it is cleared), and the encryption unit 42 encrypts the amount of proceeds and the signature with the temporary key Ktsb. The communication unit 46 transmits the amount of proceeds and the signature encrypted with the temporary key Ktsb to the communication unit 37 of the center 3. The communication unit 37 of the center 3 receives the amount of proceeds and the signature.

At step S188, the mutual authentication unit 31 of the center 3 mutually authenticates with the mutual authentication unit 51 of the clearing house 5, and the center 3 and the clearing house 5 share the temporary key Ktsp. Since the procedure for the mutual authentication is similar to the processing in FIG. 4, explanation thereon is omitted. At step S189, the signature unit 34 of the center 3 appends a signature to the amount of proceeds received from the virtual bank 4 at step S187. The encryption unit 32 encrypts the certificate of the shop received from the shop 2 during the processing of the mutual authentication at step S181; the account number corresponding to the shop ID stored in the shop management unit 36 at step 105 in FIG. 6 and encrypted with the public key Kppg of the clearing house 5; and the amount of proceeds appended with the signature of the center 3, with the temporary key Ktsp. The communication unit 37 transmits the certificate of the shop, the account number corresponding to the shop ID, and the amount of proceeds, encrypted with the temporary key Ktsp, to the communication unit 56 of the clearing house 5. The communication unit 56 of the clearing house 5 receives the certificate of the shop, the account number corresponding to the shop ID, and the amount of proceeds encrypted with the temporary key Ktsp.

At step S190, the decryption unit 53 of the clearing house 5 decrypts the certificate of the shop, the account number corresponding to the shop ID, and the amount of proceeds. The signature unit 54 confirms that the decrypted amount of proceeds is not tampered. If tampering is found, the processing is aborted. If no tampering is found, the clearing unit 55 forces the bank to execute the processing for transferring the amount corresponding to the amount of proceeds to the account number corresponding to the shop ID. At step S191, the signature unit 54 appends a signature to data indicative of the result of the processing at step S190. The communication unit 56 transmits the data indicative of the result of the deposit processing, and the signature to the communication unit 37 of the center 3. The communication unit 37 of the center 3 receives the data indicative of the result of the deposit processing, and the signature.

At step S192, the decryption unit 33 of the center 3 decrypts the data indicative of the result of the deposit processing, and the signature. The signature unit 34 confirms that there is no tampering in the data indicative of the result of the deposit processing. If tampering is found, the processing is aborted. If no tampering is found, the signature unit 34 appends a signature to the data indicative of the result of the deposit processing. The communication unit 37 transmits the data indicative of the result of the deposit processing, and the signature to the communication unit 26 of the shop 2. The communication unit 26 of the shop 2 receives the data indicative of the result of the deposit processing, and the signature, and the decryption unit 24 of the shop 2 decrypts the data indicative of the result of the deposit processing, and the signature. The signature unit 25 confirms that there is no tampering in the data indicative of the result of the deposit processing. The storage unit 22 stores the data indicative of the result of the deposit processing, followed by the termination of the processing.

As described above, the deposit of proceeds to the account of the shop 2 is processed.

In this way, the user is identified at each device using the user ID. Each device is not aware of personal information, so that upon detection of a fraud, the center 3 finds account information encrypted with the public key Kppg of the clearing house 5 based on the user ID, and requests the clearing house 5 to disclose the account information. Based on that, the personal information is identified for the certificate authority 6, the credit card company 7, or the bank 8. In this event, since it is possible to control in which case each device discloses information, and to manage logs of references to them, personal information will not be unnecessarily disclosed.

It is assumed in this specification that a system refers to a general apparatus which is composed of a plurality of devices.

As a providing medium for providing a user device with a computer program for executing the processing as described above, communication media such as networks, satellites, cables and so on may be utilized in addition to recording media such as magnetic disks, CD-ROM, solid-state memories and so on.

Also, while FIG. 1 of the present invention illustrates in such a manner that the user device 1, the shop 2, the center 3, the virtual bank 4 and the clearing house 5, the certificate authority 6, and the credit card company 7 and the bank 8 exist independently of one another, some of these functions may be grouped into one. For example, the functions of the center 3, the virtual bank 4 and the clearing house 5 may be combined into the center 3.

In the present invention, the shop 2 need not hold any special apparatus, and is only required to register itself in the center 3. This is implemented by the center 3 which manages an ID issued to a card and provides it to the shop.

According to an electronic cash system of the invention, an account management apparatus stores information for identifying the user and the amount of money utilized by the user based on previously deposited funds, a settlement processing apparatus instructs the payment institution to settle, and a control apparatus manages the information for identifying a user, and an account number in the payment institution of the user, encrypted with a public key of the settlement processing apparatus, instructs the account management apparatus to change the balance of the deposited funds of the user, stored therein, based on the information for identifying the user, and instructs the settlement processing apparatus to execute a settlement based on the account number in the payment institution, so that the user can securely utilize electronic cash without the need for managing a special apparatus, each apparatus cannot unnecessarily know personal information and information on individual's purchase information, frauds can be detected, and the circulation of money can be managed.

INDUSTRIAL APPLICABILITY

The present invention can be utilized in an electronic cash system for electronically managing the circulation of cash and information, and for depositing and withdrawing funds.

The invention claimed is:

1. A method of transferring electronic cash from first user device to a second user device, said method comprising:
   mutually authenticating the first user device and the second user device;
   sharing a temporary key between the first user device and the second user device;
   appending, at the first user device, a signature associated with the first user device to a monetary amount of electronic cash that is to be transferred from the first user device to the second user device;
   encrypting, at the first user device, the transfer monetary amount of electronic cash and the appended signature associated with the first user device using the temporary key;
   transmitting, from the first user device to the second user device, the encrypted transfer monetary amount of electronic cash and the encrypted signature associated with the first user device;
   decrypting, at the second user device, the encrypted transfer monetary amount of electronic cash and the encrypted signature associated with the first user device using the temporary key;
   adding, at the second user device, the transfer monetary amount of electronic cash to a stored monetary amount of electronic cash associated with the second user device;
   appending, at the second user device, a signature associated with the second user device to the transfer monetary amount of electronic cash;
   encrypting, at the second user device, the transfer monetary amount of electronic cash and the appended signature associated with the second user device using the temporary key;
   transmitting, from the second user device to the first user device, the encrypted transfer monetary amount of electronic cash and the encrypted signature associated with the second user device;
   decrypting, at the first user device, the encrypted transfer monetary amount of electronic cash and the encrypted signature associated with the second user device using the temporary key; and
   subtracting, at the first user device, the transfer monetary amount of electronic cash from a stored monetary amount of electronic cash associated with the first user device.

2. The electronic cash transfer method according to claim 1, wherein the signature associated with the first user device is a device number unique to the first user device, the temporary key is a public key of a management apparatus, and
   the first user device appends the unique device number to the transfer monetary amount of electronic cash, encrypts the transfer monetary amount of electronic cash and the appended unique device number using the public key of the management apparatus, and transmits the encrypted transfer monetary amount of electronic cash and the encrypted unique device number to the second user device.

3. The electronic cash transfer method according to claim 1, wherein the second user device adds the transfer monetary amount of electronic cash to the stored monetary amount of electronic cash associated with the second user device, appends the associated with the second user device to the transfer monetary amount of electronic cash, encrypts the transfer monetary amount of electronic cash and the appended signature associated with the second user device, and transmits the encrypted transfer monetary amount of electronic cash and the encrypted signature associated with the second user device to the first user device when the decrypted signature associated with the first user device authenticates the first user device.

4. The electronic cash transfer method according to claim 1, wherein the first user device subtracts the transfer monetary amount of electronic cash from the stored monetary amount of electronic cash associated with the first user device when the decrypted signature associated with the second user device authenticates the second user device.

5. The electronic cash transfer method according to claim 1, further comprising:
   appending, at the first user device, the signature associated with the first user device to data indicating a completed transfer of electronic cash from the first user device to the second user device;
   encrypting, at the first user device, the data indicating the completed transfer of electronic cash and the appended signature associated with the first user device using the temporary key;
   transmitting, from the first user device to the second user device, the encrypted data indicating the completed transfer of electronic cash and the encrypted signature associated with the first user device; and
   decrypting, at the second user device, the encrypted data indicating the completed transfer of electronic cash and the encrypted signature associated with the first user device using the temporary key.

* * * * *

UNITED STATES PATENT AND TRADEMARK OFFICE
CERTIFICATE OF CORRECTION

PATENT NO. : 7,155,418 B2 Page 1 of 1
APPLICATION NO. : 10/689803
DATED : December 26, 2006
INVENTOR(S) : Shinako Matsuyama It is certified that error appears in the above-identified patent and that said Letters Patent is hereby corrected as shown below:

On the Title page, item [57] Abstract (57), line 4, after "on", insert --an--.
Column 1, line 29, after "for", insert --a--.
Column 3, line 8, "includes" should read --including--.
Column 3, line 9, "f or" should read --for--.
Column 3, line 13, "includes" should read --including--.
Column 3, line 16, "includes" should read --including--.
Column 9, line 46, after "is", insert --a--.
Column 12, line 14, "crete" should read --create--.
Column 12, line 64, "decrypt" should read --decrypts--.
Column 18, line 42, "make" should read --makes--.
Column 19, line 12, "the-signature" should read --the signature--.
Column 21, line 22, after "from", insert --a--.
Column 22, line 25, after "the", insert --signature--.

Signed and Sealed this

Eighteenth Day of September, 2007

JON W. DUDAS
*Director of the United States Patent and Trademark Office*